Nov. 19, 1963    R. V. WERNER ETAL    3,111,665
SEQUENCED SPATIAL COORDINATE DETERMINING SYSTEM
Filed May 23, 1958    11 Sheets-Sheet 1

INVENTORS
Robert V. Werner
Walter J. Zable
William J. Thompson
BY Hugh L. Millis Jr.

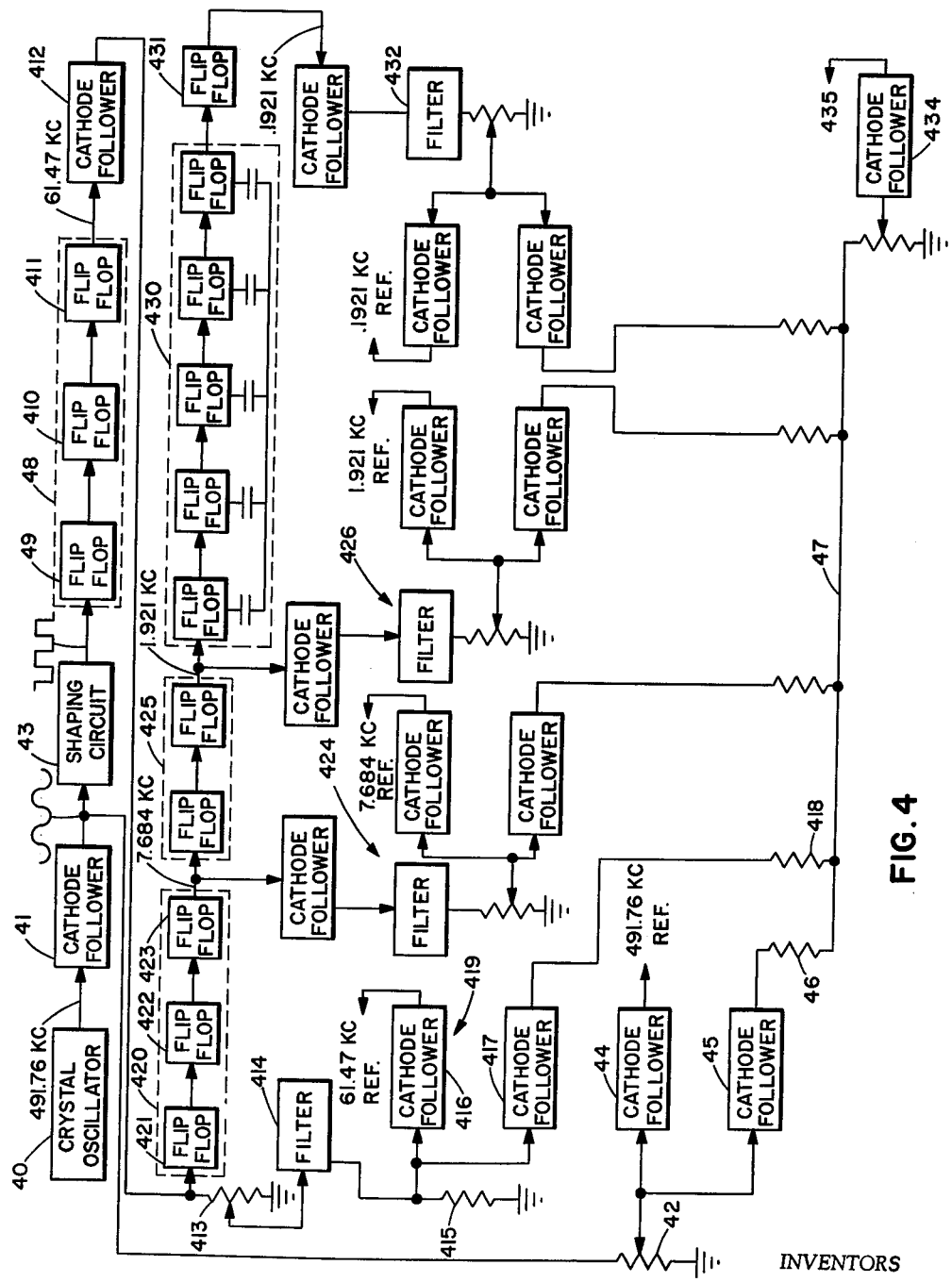

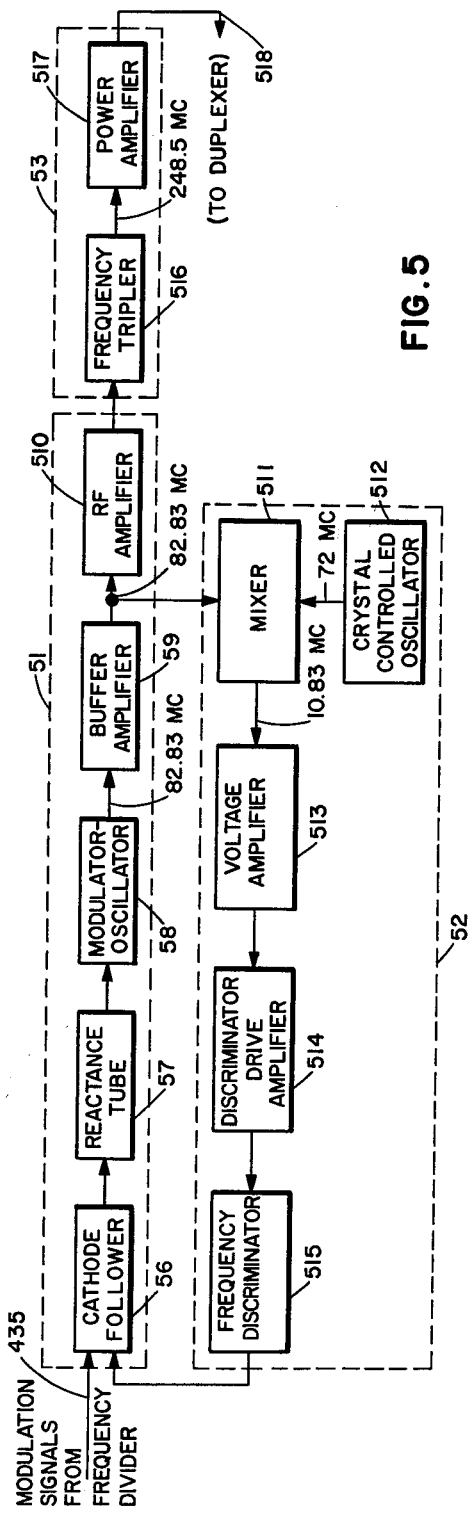
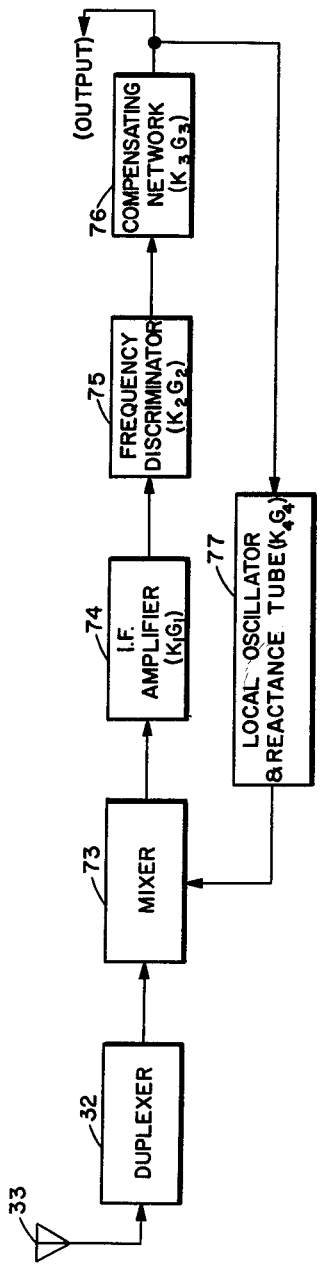

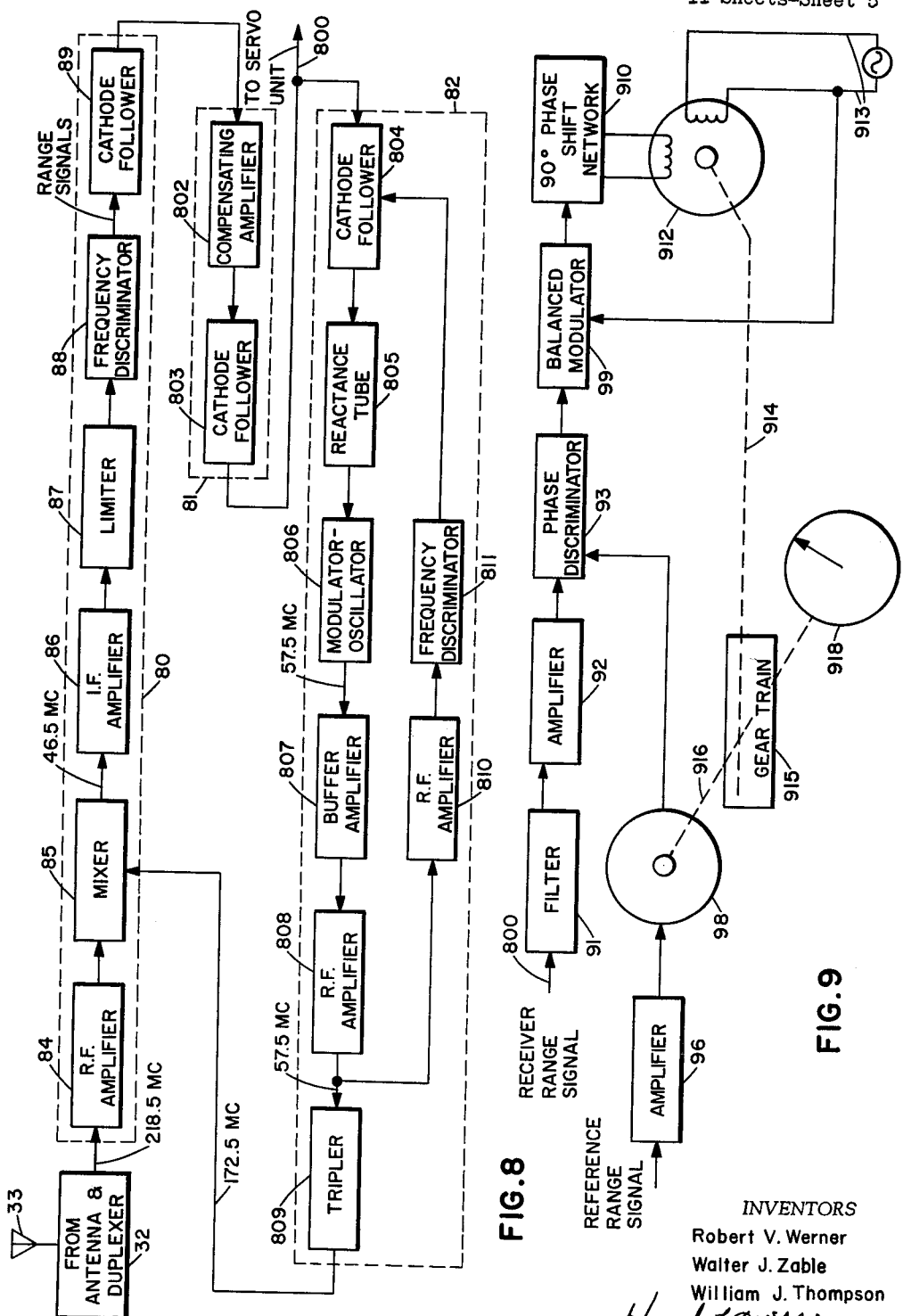

INVENTORS
Robert V. Werner
Walter J. Zable
William J. Thompson

United States Patent Office 3,111,665
Patented Nov. 19, 1963

3,111,665
SEQUENCED SPATIAL COORDINATE
DETERMINING SYSTEM
Robert V. Werner, La Mesa, and Walter J. Zable and William J. Thompson, San Diego, Calif., assignors to Cubic Corporation, San Diego, Calif., a corporation of California
Filed May 23, 1958, Ser. No. 737,446
9 Claims. (Cl. 343—12)

The present invention relates to a sequenced spatial coordinate determining system, and, more particularly, to a set of spaced, slant-range determining units sequentially operated for acquiring spatial coordinate information of a radio-responding target.

The determination of the exact spatial location at any instant of a moving object, and the exact path made by such an object as it undergoes changes of its direction and velocity, is becoming increasingly important in a number of areas. For example, in the development and testing of guided missiles, extremely accurate trajectory information of test flights is required in order that telemetered information pertaining to various internally-monitored operations may be correlated with the missile's exact flight path in order to provide corrective design data, equipment failure, etc. Also, such information may be employed for evaluating the accuracy of missile self-contained inertial guidance packages or for range-safety purposes where the missile may be ordered destroyed in flight in the event its path deviates more than a predetermined amount from a prescribed route. Other uses for equipment having the characteristics described include satellite tracking, surveying, aircraft tracking for landing control operations, air traffic pattern control, etc.

All of these uses, and other similar ones, require that the trajectory information be continuous, reliable over all meteorological conditions, and, in addition, possess, as stated previously, consistent accuracy over the entire flight path. Two common systems employed in the prior art for achieving such missile and aircraft flight-path information and having accuracies at least in the neighborhood of the accuracy desired, have been of the radar and optical tracking variety. Both of these systems possess certain basic unalterable limitations which severely restrict their utility and magnify their operational difficulties when applied to the distance-measuring problem of the type outlined above.

In the first place, both optical and radar tracking systems are highly directional in nature with extremely limited fields of view; the optical by reason of the high resolving power required in its telescope portion and the radar by reason of its very narrow antenna beam. These common properties make target acquisition very difficult since the respective telescope and antennas must be directed substantially at the target before tracking can commence. Hence, either auxiliary target-locating techniques must be employed or a priori information of initial target location used for acquisition purposes. This requirement generally increases the amount of auxiliary equipment, delays the time of acquisition with a resultant loss of valuable tracking data, and imposes a degree of uncertainty in the entire tracking operation upon the potential failure to initially acquire the target.

The optical tracking technique further possesses a unique limitation in that tracking can proceed only during satisfactory meteorological conditions. That is, clouds, fog, haze, dust, etc., which obscure the target from the sighting station effectively prevent tracking, since a direct line of visual sight is obviously a physical requirement for successful operation.

Another limitation of optical tracking systems is that target tracking is performed manually, that is, a human operator is employed in the servo feedback loop for maintaining the optical cross-hair position on the target image presented in the telescope. Quite obviously, any deficiencies in the servo response of the human operator during a run are reflected as direct inaccuracies in the tracking data derived from the station. These human-derived errors are present in addition to the normal servo errors existing in the telescope driving loop, etc.

Radar tracking systems, on the other hand, also possess limitations and disadvantages other than the acquisition problem. Foremost is the limited accuracy achievable, substantially at least an order of magnitude less than the optical tracking method and the system proposed in accordance with the present invention. This radar accuracy limitation is primarily based on the degree of accuracy to which the actual antenna pattern direction can be measured through the antenna drive mechanism. The inaccuracies primarily are due to gear wear and backlash, and difficulties of accurately calibrating the antenna pattern direction with the antenna mechanical placement.

Also, the accuracy to which the antenna pattern can be servoed to the target direction is limited by the noise in the received signal, antenna pattern variations upon antenna rotation, etc. Then, too, the radar servo system employed for driving the antenna will introduce normal servo hunting errors and the target range measurement taken by measuring the time delay between the transmitted and received pulses is limited in accuracy by the receiver input noise level, greater in many cases than the actual traget echo, of very small magnitude. Then, too, a massive installation is required to achieve target tracking up to even reasonable ranges. Such radars require a large antenna, heavy servo drive equipment, high-power electronic pulsing equipment, etc. These size and power requirements are dictated by the fundamental radar technique of using reflected signal information from the target with the resulting high attenuation factors. Then, too, since radar operates by transmitting sharp, discrete pulses, the derived information of target position will not be intrinsically continuous in nature, but rather of a spaced, discontinuous nature.

These difficulties and limitations of existing optical and radar tracking equipments are elegantly overcome in the system according to the present invention. In particular, the system according to the present invention comprises three, similar ground-based distance-measuring units, each capable of determining the slant range between it and an airborne traget vehicle. Consider, first of all, the operation of a single distance-measuring unit in conjunction with the target vehicle.

The distance-measuring unit transmits a carrier signal frequency-modulated by a plurality of, as termed, range signals, having, in the specific equipment herein set forth, five frequencies, varying from a high of 491.76 kc. to a low of .192 kc. All range signal frequencies are maintained constant by employing a single crystal source and counting down the signal produced thereby in a series of bistable multivibrator flip-flop or counting circuits. Then, the desired range signals are taken off of appropriate flip-flops, filtered to extract the sine wave fundamental, linearly mixed, and finally employed to modulate the ground carrier signal.

Before setting forth the need for employing a plurality of range signals, rather than just one, consider first the operation of the remaining portion of the system. The target vehicle carries a transponder which receives the ground-transmitted signal, demodulates it into the five range signals and then employs the range signals to modulate a transmitted carrier signal having a center frequency displaced from the ground-based carrier signal, as is needed for avoiding obvious signal interference difficulties. The ground unit receives the transponder-carrier signal, demodulates it and passes these demodulated range signals along with the originally-produced range signals to a servo section for slant range determination and readout purposes.

These range signals, in traveling from the ground to the target vehicle and back to ground, experience cumulative phase shifts based on the total distance traveled, which, as will be appreciated, is twice the slant range. The readout section operates to effectively determine the phase delay experienced in the range signals by comparing the phase difference between the originating and received signals and yielding a calibrated readout of the total slant range based on the comparison.

A plurality of ranging signals is required to meet accuracy requirements without introducing range ambiguities, since the accuracy to which a readout section can measure phase difference between two signals of the same frequency is based on a percentage of their wavelength. Hence, to achieve accuracies on the order of a few feet, a system requirement, a relatively short wavelength range signal must be employed. However, with system tracking requirements up to, say, several hundred miles, such a short wavelength signal will experience many cycles of phase shift during its over-all travel out and back, and the target's exact location will thus not be determinable but will, as termed, be ambiguous. On the other end of the modulation signal frequency scale, the longest wavelength signal will not cyclically repeat within the target range selected for the ground station operation, and hence not possess ambiguity, but will be capable of locating the target to only a very limited precision, much less than desired.

Thus, in accordance with the present invention, a number of range signals are employed, of increasingly shorter wavelengths, the longest wavelength signal being used in the servo readout section for unambiguous target location with each of progressively shorter wavelength signals being used for resolving inherent ambiguities in the next shorter wavelength signal until the shortest, most accurate, wavelength signal is reached. In this way, target location is attained to an accuracy dictated by the shortest wavelength range signal throughout a total range dictated by the longest wavelength signal.

In particular, the servo section includes five channels, one for each range signal. Each channel takes its corresponding delayed range signal received from the transponder and the originating range signal as transmitted to the transponder and compares the two across a resolver whose shaft displacement, at a point of zero resolver output signal, represents the phase displacement between its two input signals. At all other resolver shaft positions, an output revolver signal will be produced corresponding to the direction and amount of its shaft displacement away from a null position corresponding, as stated above, to the phase displacement between the two range signals applied to the resolver.

The channel resolver shafts are coupled to a servo motor driven gear train at step-down ratio points corresponding to the respective frequency ratios. Now, the servo motor will be energized by one, and only one, of the channel resolver error signals at any one time, the energization being such as to drive the gear train in a direction to reduce the resolver output of the particular channel, having control, to zero. The channel selection is accomplished by continually sensing the resolver error in each channel and switching the lowest range frequency channel, that is, the channel having the greatest ambiguity resolving ability, into the servo motor control condition whenever its resolver error reaches a predetermined magnitude. In this way, ambiguity is continuously resolved, especially during times of acquisition and upon the temporary loss of signal information from any cause, and high-accuracy readout achieved during normal operating conditions when the highest range frequency channel is in the servo motor drive position.

One possible source of system error would, of course, be caused by phase shifts incurred in the range signals as they passed through the transponder and ground station receiver portions, due to tube aging, I.-F. channel drift, etc. This source of error is effectively eliminated in accordance with the present invention by providing heavy degenerative feedback loops in both of these receiver portions which serve to completely stabilize phase shift and amplitude of the passed signals and hence enable the accuracy requirements to be met.

The slant range information may be derived from counters, dial and pointer arrangements, etc., coupled to the resolver shafts in the respective channels, since the shaft positions, at null, will correspond to the phase difference between the two compared signals and hence target range.

As stated earlier, three ground stations of the type described are needed to acquire spatial coordinate information of the transponder-carrying vehicle. This is true since a single station determines slant range only, and three slant-range readings taken from spaced stations are the minimum number needed to locate the target vehicle in space. In accordance with the present invention, then, three ground stations are jointly operated with a single transponder in the airborne vehicle. In particular, by making appropriate internal switch connections, one station is delegated to act, as termed, a Master, and the other two as Slave No. 1 and Slave No. 2, respectively. With this arrangement, an additional or special signal is mixed with the range modulation signals of the Master station only, to furnish sequencing information. Also, a relatively low frequency free-running multivibrator, operable in the Master station only, is employed for timing purposes and used for gating the Master station transmitter on for about the first third of each cycle marked by its output signal. The servo section of the Master station is simultaneously actuated with its transmitter section so that it will operate only on the phase delay incurred between the signal transmitted by its transmitter section and the corresponding transponder return signal.

The special, sequencing modulation signal appearing on the Master station signal will be recognized by Slave No. 1 as it monitors the corresponding transponder retransmittal to the Master station, and, following its completion, the transmitter of this second Slave will be actuated for approximately the second third of the cycle marked by the Master station transmittal. The servo unit of this first Slave will also be actuated simultaneously with its transmitter so that it might operate with the transponder signal corresponding to its transmitted signal.

Finally, the special sequencing signal inserted in the Master station signal will also be recognized by the second Slave and a two-thirds cycle delay initiated. Following the completion of this delay interval, the transmitter and servo units of Slave No. 2 will be simultaneously actuated, for about the final third of the timing interval, for acquiring its slant range information to the target vehicle. Following this, the Master station, under control of its multivibrator timing signal, will again communicate with the transponder, thus initiating the next cycle.

This sequencing arrangement requires no ground or direct communication link between the three ground-based stations; rather, the sole communication link exists from the Master to the two Slaves through the transponder. Thus, the over-all system requirements are held to simple, reliable minimum.

Spatial coordinate information of the target path may be taken from the three distance-measuring stations in a number of ways. Continuous records of the channel resolver positions in the servo readout sections can be made either by photography, recording on magnetic tape, or acquired in binary or binary-coded form by appropriate disc pick-offs and recording arrangements. By marking absolute or relative time on the records made at each station, and knowing the location of each station, the exact target path can be computed in any desired coordinate system from the resulting records taken at the three stations.

In another aspect of the present invention, the overall range coverage achievable by three stations of the type described may be extended indefinitely by placing additional stations along the vehicle course. Then, by switching arrangements, at least three of the stations, appropriately delegated to act as a Master and the two Slaves, are kept continually in communication with the transponder-carrying vehicle. This is performed by switching one station out as the target continues down-range and progresses to a point of maximum range from the station, and switching another station, within range, in. The new station thus is brought in as a Master or Slave, as appropriate, to operate properly with the two remaining stations.

The resulting tracking system of the present invention alleviates the deficiencies and disadvantages in the radar and optical systems, as earlier noted. In the first place, the present system is inherently omnidirectional by nature and hence is able to achieve immediate target acquisition without auxiliary equipment or special target location knowledge, as is the case with both optical and radar systems. Further, unlike the optical system, the present system is able to track in adverse meteorological conditions, and no human operators are required for closing the servo tracking loops.

Also, by selecting appropriate upper and lower range modulating frequencies on the order of one-half megacycle for the upper frequency and two hundred cycles for the lower, tracking may proceed up to several hundred miles at accuracies approaching a single foot in distance. This accuracy is greatly in excess of that obtainable by the finest radar installations and is superior to a majority of optical sighting stations.

It is, accordingly, the principal object of the present invention to provide a sequenced group of slant-range measuring stations for acquiring spatial coordinate information of a transponder-carrying target vehicle.

Another object of the present invention is to provide at least three ground-based systems, each capable of determining the slant range to a transponder-carrying vehicle, and sequentially operating the three ground-based systems for providing spatial coordinate information location of the target vehicle.

Still another object of the present invention is to provide an apparatus for sequentially operating three systems, each capable of measuring the slant range to an object, for deriving exact positional location of the object.

A further object of the present invention is to provide sequencing apparatus for sequentially operating three slant-range measuring units in radio communication with a single transponder carried by a moving target vehicle whereby exact positional information of the target vehicle location is obtained.

A still further object of the present invention is to employ a Master slant-range measuring unit in periodic communication with a transponder carried by an object whose path is to be tracked, and providing sequencing information from the Master to two additional slant-range measuring units through the transponder whereby the slant range information obtained by the Master and the two additional slant-range measuring units represent spatial coordinate information of the path made by the object.

Still another object of the present invention is to provide first, second and third slant-range measuring units in conjunction with a single transponder carried by a target vehicle whose path is to be tracked, and transmitting sequencing data through the first slant-range measuring unit for sequentially operating the said second and third slant-range measuring units in conjunction with the first.

Another object of the present invention is to provide a group of ground-based sequentially-operated stations, each station, when operated, being in radio communication with a radio-responding target vehicle wherein each ground station determines slant range to the vehicle by comparing phase shifts incurred in a plurality of range signals in being propagated to the vehicle and back.

Still another object of the present invention is to provide three stations, each capable of transmitting and receiving a plurality of range signals to a transponder located in a moving target and determining the slant range thereto by measuring the phase shifts in the range signals, and sequentially operating the three stations to determine spatial coordinate information of the vehicle path.

A further object of the present invention is to provide three identical measuring systems, each capable of determining slant range to a transponder-carrying target vehicle and selectively capable of transmitting sequencing data to the two remaining systems such that all three systems may coact sequentially with the transponder in the target vehicle to derive spatial coordinate information of the vehicle path.

A still further object of the present invention is to provide three slant-range measuring systems, each capable of determining slant range to a radio-responding object, in which one of such slant-range measuring systems communicates with the object at periodic intervals and the two remaining systems sequentially communicate with the object between the periodic communication intervals of the first slant-range measuring system.

Still another object of the present invention is to provide at least two sets of spatial coordinate determining units positioned along the flight path to be made by a target vehicle, each of said sets being selectively operable to determine spatial coordinate flight-path information, and operating first one and then the other of the sets in accordance with the target position along its path.

Another object of the present invention is to provide a plurality of sets of spatial coordinate determining units positioned along the flight path of a target vehicle to be tracked, each of the sets being selectively operable to acquire spatial coordinate flight-path information of the target vehicle, and sequentially operating the sets as the target vehicle proceeds along its flight path to thereby achieve extended distance tracking capabilities.

A still further object of the present invention is to provide a plurality of sets of spatial coordinate determining units positioned along the flight path to be made by a target vehicle, each of said sets having limited distance measuring properties but the vehicle track being within range of at least one of the sets at all times, and sequentially operating the sets such that a set within range of the target vehicle is always operated as the vehicle proceeds down its flight path.

Other objects, features and attendant advantages of the present invention will become more apparent to those skilled in the art as the following disclosure is set forth including a detailed description of a preferred embodiment of the invention as illustrated in the accompanying sheets of drawings in which:

FIGURE 4 is a circuit diagram, in block diagrammatic form, of the range signal generator section of a distance-measuring unit;

FIGURE 5 is a circuit diagram, in block diagrammatic form, of a data transmitter section of a distance-measuring unit;

FIGURE 7 is a functional block diagram of the ground receiver;

FIGURE 8 is a circuit diagram, in block diagrammatic form, of the receiver section of a distance-measuring unit;

FIGURE 9 is a block schematic diagram of a representative servo readout channel in conjunction with the servo motor drive equipment of a distance-measuring unit;

The physical principle upon which one aspect of the present inveniton is based is that an electromagnetic wave, propagated through an isotropic, homogeneous medium, experiences a cumulative phase shift repeated cyclically as it travels through the medium. The phase shift thus produced is proportional to the distance traveled by the wave at a known finite velocity and to the wavelength of the propagating signal frequency. As an example, a phase shift of 360 degrees will be experienced for every 2000 feet of travel for a 491.76 kc. signal.

It can be shown that this phase shift and frequency relationship of a transmitted signal holds whether the signal in question is a carrier or a modulated component superimposed on a carrier by either amplitude or frequency modulation techniques. Hence, in the previous example, the 491.76 kc. wave would undergo a 360-degree phase shift every 2000 feet of travel, regardless of whether it originated as a carrier or as a modulation signal superimposed on a carrier.

This phase shift principle is utilized in accordance with the present inventions for determining scalar range, that is, the non-directional distance between a pair of coacting, displaced instruments. In particular, by locating a transmitter on the ground, for example, and a transponder in an airborne vehicle, for example, and observing the phase delay incurred between a ground transmitted signal of constant known frequency, and the same signal as received and retransmitted without phase delay by the target transponder, an indication or measurement of absolute distance between the two units may be obtained.

Figure 1:
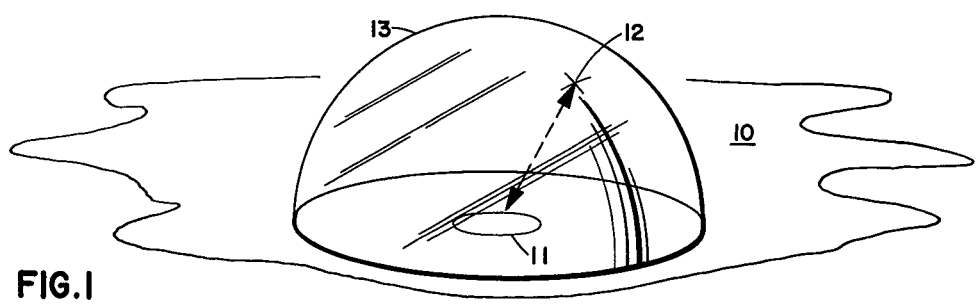
FIGURE 1 is a schematic representation illustrating the slant-range determining characteristics of a single distance-measuring unit.

The distance information so derived is scalar in nature since simple phase delay measurements include no directional information. Thus, the target is located only to the extent that it lies along the surface of a sphere whose center lies at the ground station. Since the target will be assumed to be above ground level, the range information will actually form a hemisphere, again with the transmitter at the hemisphere center. This is shown schematically in FIGURE 1 where point 11 represents the ground-based transmitter location, point 12 the target location and 13 the hemispherical envelope representing the location of target 12 viewed from the scalar range capabilities of the transmitter.

In order to simplify subsequent discussions of the present invention, particularly when a plurality of ground stations are simultaneously employed in a sequential manner to determine spatial coordinate information of the target's location, a single ground station and airborne transponder will hereafter be generally referred to as a DMU, abbreviation for distance-measuring unit. Furthermore, in order to present various aspects of the present invention in a related order, particularly for the purpose of later developing complex associations between similar systems elements, in as simple a manner as possible, a single DMU system, including ground-based and air-based equipment will first be described in detail. Then, the basic system will be structurally expanded in order to enable a group or set of three DMU's to be simultaneously employed with a single transponder for acquiring continuous information concerning the path made by a target vehicle. Still further, arrangements will be shown which enable a larger number of DMU stations to be sequentially associated into coordinating sets of three in order to attain target tracking capabilities over a distance greatly exceeding the original capabilities of a single set of three DMU's.

Returning now to a single DMU station, capable of determining scalar range only, consider the relationship existing between the frequency of an interrogating signal from the ground, the distance between ground station and target, and the accuracy desired in the ultimate range measurement. Assume for the purpose of example, that the target vehicle is to be tracked up to a maximum of approximately 200 miles. Omitting temporarily some other considerations, since the interrogating signal must travel to the transponder and back, or twice the actual range, its wavelength must be twice that needed for a straight 200-mile distance. Further, in the readout servo equipment employed, to be described in more detail later, a phase difference of only 180 degrees between two signals of the same frequency can be resolved without ambiguity. In order to overcome this basic readout equipment limitation, the originating wavelength must again be doubled. Thus, the wavelength of the transmitted frequency required to track out to 200 miles without ambiguities is:

$$\lambda = 2 \cdot 2 \cdot 200 = 800 \text{ miles}$$
$$= 4.224 \times 10^6 \text{ ft.}$$

Since the signal frequency is equal to the velocity of light divided by the wavelength, assuming compatible units of measurement:

$$f = \frac{9.84 \times 10^8}{4.244 \times 10^6} = 233 \text{ c.p.s.}$$

This means then that a signal of 233 c.p.s. will give an unambiguous range reading up to 200 miles. This reading is termed unambiguous since if a higher frequency were employed, of a shorter wavelength, an identical phase shift reading would be obtained for more than a single target location. For example, if twice the frequency, or 466 c.p.s., were used then identical phase shifts would occur for a target located at either 100 or 200 miles and insufficient information would be present in this case to determine at which particular distance the target was located. Hence, the range reading of the target location in this example would be, as stated, ambiguous.

The other factor concerned with choosing the particular interrogating signal frequencies to be employed is that of accuracy. According to the best available practice in the phase meter art, employed as a portion of the readout mechanism in the present invention, phase difference can be measured to a precision of approximately 0.3 degree. Since an 800-mile wavelength will change 1 degree of phase for every 800÷360 or 2.22 miles traveled, the best precision obtainable is 2.22×0.3 or .66 mile, which is approximately 3500 feet. It is apparent that a reading having this degree of inaccuracy is of only very limited or marginal use. For evolving equipments having accuracies compatible with the uses noted earlier, it is apparent that an accuracy improvement of several orders of magnitude is required over that obtainable for an 800-mile wavelength interrogating signal.

Accuracy requirements and ambiguity limitations are simultaneously met and accomplished in the DMU equipment according to the present invention by employing a plurality of signals, five to be exact, of increasingly shorter wavelengths. The lowest frequency is chosen to provide unambiguous range information up to a maximum certain value, selected in the present case to be slightly over 200 miles. On the other hand, the highest frequency employed is selected to yield the desired accuracy, in the present case about 2½ feet. The three remaining frequencies, lying between the highest and the lowest, are selected to give continuous, unambiguous steps between the highest and lowest frequencies. Further attention is directed in the choice of these intermediate frequencies to overcome certain discrete switching or selection time limitations in the servo readout unit and still yield continuous, accurate readout information. This factor will be discussed in more detail later.

Below in Table I, are listed the five interrogating signal frequencies, their wavelength in feet and their maximum unambiguous distance measurement capabilities, that is, $\lambda/4$ or one-fourth of their wavelengths.

TABLE I

| Range | Range Signal Frequency, kc. | $\lambda$ in Feet | $\lambda/4$ |
|---|---|---|---|
| Very fine | 491.76 | 2,000 | 500 |
| Fine | 61.470 | 16,000 | 4,000 |
| Intermediate | 7.68375 | 128,000 | 32,000 |
| Coarse | 1.9209 | 512,000 | 128,000 |
| Very Coarse | .192094 | 5,120,000 | 1,280,000 |

As will be observed by inspection of Table I, the five interrogating signal frequencies, later termed range or range modulation signals, are harmonically related to one another. The Fine frequency is one-eighth (⅛) the Very Fine, the Intermediate is one-eighth (⅛) the Fine, the Coarse is one-fourth (¼) the Intermediate, and the Very Coarse is one-tenth (¹⁄₁₀) the Coarse. As will be seen later, it is possible to attain a simplified range signal generating system by employing harmonically-related interrogating signals, and maintain all frequencies to extreme accuracy, which is, of course, a systems requirement for achieving precise range measurement.

Figure 2:
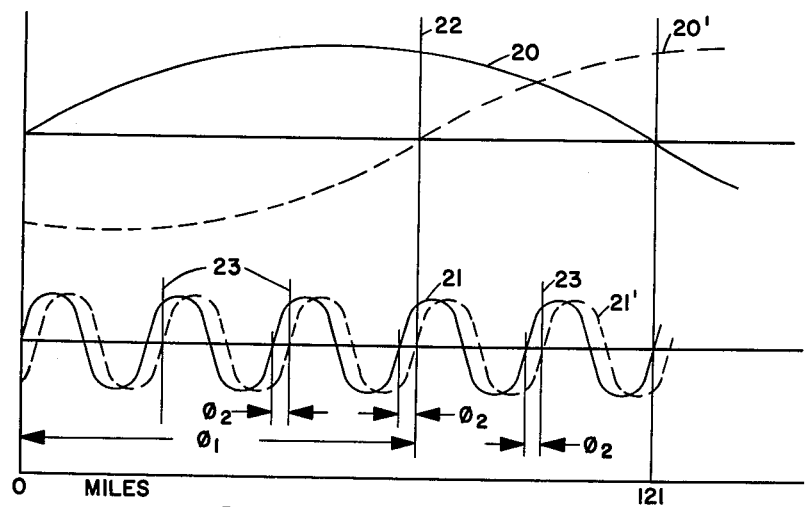
FIGURE 2 illustrates the inherent ambiguity characteristics of one range signal compared to another, both being employed in a distance-measuring unit.

FIGURE 2 illustrates, by way of example, the frequency relationships existing between the two lowest interrogating signals, the transmitted and received Very Coarse signals, shown at 20 and 20', respectively, and the transmitted and received Coarse signals shown at 21 and 21', respectively. Only the first half cycle of signal 20 is shown and at 22 is shown a line located at the zero cross-over point of received signal 20', which marks the phase delay, $\phi_1$, introduced between signals 20 and 20'. Several points of zero cross-over of the received Coarse signal 21' are indicated at lines 23 which in turn mark a $\phi_2$ phase difference with the transmitted Coarse signal 21.

As will be observed, if only Coarse signal 21 were employed, phase shift $\phi_2$ indicated thereby would be ambiguous over the range obtainable by signal 20, since it repeats a number of times during a half cycle of signal 20. Applying the accuracy computation given previously, it can be shown that the accuracy measurable in phase shift $\phi_1$ is only 4,266 feet; while the $\phi_2$ phase shift is measurable to an accuracy of 426 feet. Thus, it is seen that the Very Coarse signal will produce relatively inaccurate but unambiguous information while the higher Coarse signal will produce ambiguous information but of a relatively higher accuracy.

Figure 3:
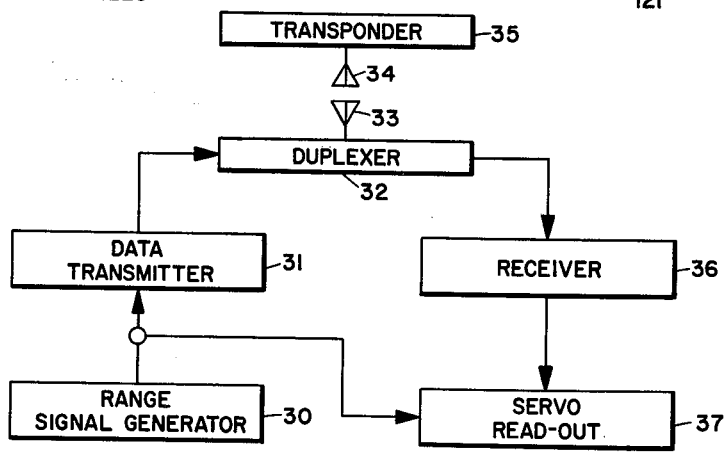
FIGURE 3 is a block schematic representation of the major sections of a distance-measuring unit according to the present invention.

FIGURE 3 shows the basic units or sections of a DMU station. First, a range signal generator 30 produces the harmonically-related range signals, corresponding to those given previously in Table I. These signals are applied to a data transmitter 31 which frequency-modulates the range signals on an F.-M. carrier, the resulting frequency-modulated carrier signal being coupled through a duplexer 32 to a ground transmitting antenna 33.

The transmitted signals are received by a transponder antenna 34 and applied to the transponder section 35. This transponder section demodulates the received F.-M. signal and, without phase shifting the demodulated range signals, frequency-modulates them on a transponder carrier signal having a different center frequency than the ground transmitted signal. This transponder output signal is coupled back to antenna 34 and retransmitted to be received by ground station antenna 33. This ground received signal is coupled through duplexer 32 into a receiver section 36 where it is again demodulated into the original range signal frequencies which are phase shifted relative to the transmitted range signals by an amount corresponding to the transponder range. Finally, a servo output section 37 receives both the original and delayed range signals from range signal generator 30 and receiver 36, respectively, and operates upon their phase difference to produce a readout indication of the target scalar range.

By way of summary, FIGURE 3 illustrates the major units and their relationship as they, in combination, form a single DMU system. There follows detailed illustrations and discussions of each of these major units. In particular, range signal generator 30 is described in connection with FIGURE 4, data transmitter 31 in connection with FIGURE 5, transponder 35 in connection with FIGURES 6 through 8, receiver 36 in connection with FIGURE 9 and finally servo readout section 37 in connection with FIGURES 9 through 14.

*I. Range Signal Generator*

The range signal generator 30 of FIGURE 3, is shown in detail in FIGURE 4. As stated previously, this generator serves to produce the five range modulation signals employed for modulating the ground transmitted carrier signal for distance determination to the target vehicle.

In order that all ranging signals be harmonically related and of constant frequency, one basic signal source, whose frequency corresponds to the Very Fine range signal, is provided and its frequency progressively counted down through a number of binary flip-flops or counting circuits until the lowest, or Very Coarse range frequency is obtained. In the counting-down process, the Fine, Intermediate, Coarse and Very Coarse frequencies are extracted as square waves, as typically produced by flip-flop circuits, the fundamental frequency of each being filtered to provide substantially pure sine waves for the subsequent modulating and servo comparison circuits.

The highest or Very Fine frequency is obtained from a sine-wave oscillator, such as crystal controlled oscillator 40, designed to oscillate at a 491.76-kc. frequency. This crystal oscillator may take any of the well-known crystal circuit configuration forms and is preferably temperature-controlled in accordance with the best practice in the crystal oscillator art in order that its output frequency will be maintained substantially constant.

The output signal of oscillator 40 is routed through an impedance isolating circuit, such as cathode follower circuit 41, which provides a constant output impedance to oscillator 40 and prevents output loading variations from affecting its frequency stability. A level control potentiometer 42 is coupled between the output terminal of follower 41 and ground and its movable arm is coupled to the inputs of cathode followers 44 and 45. The output signal of follower 45 is taken through a mixing resistor 46 to a range signal common line 47 while the output signal of follower 44 is taken as a reference signal for coupling to the Very Fine channel of the servo unit, as shown later in FIGURE 11. The output signals of both followers 44 and 45 will be sine waves of the crystal oscillator frequency of 491.76 kc. and represent the Very Fine range signals.

The output signal of cathode follower 41 is also applied to a shaping circuit 43 which acts to convert its sine wave shape into square wave form. This may be done in conventional fashion by amplifying the sine wave input and clipping the upper and bottom portions by diode clamping action. This square wave signal is then applied to the input terminal of a first flip-flop 49 which in conjunction with second and third flip-flops 410 and 411, respectively, form a scale-of-eight binary counter 48.

Flip-flop 49 as well as all other flip-flops in this figure excepting those included in the ring-of-five counter 430, to be subsequently described, may be of the type found in FIGURE 2 of the article entitled "Stable Ten-Light Decade Scalar" found on pages 84 and 85 of the May 1949 issue of the magazine Electronics and designated as the scale-of-two circuit. This particular type of flip-flop will be triggered into changing its conduction state upon the application of a negative-going signal to its input terminal. Hence, for each cycle of the square wave input applied to it from circuit 43, and, in particular the part of the cycle when the square wave signal goes from its high to low voltage level, flip-flop 49 will be triggered into changing its conduction state. Hence, for each two cycles of the input square wave, flip-flop 49 will be triggered twice, corresponding to the two negative-going portions in the two cycles, and its output signal will make one complete cycle excursion. In the same way, each complete cycle in the output signal produced by flip-flop 49 will cause one triggering of flip-flop 410. Hence, flip-flop 410 will be triggered to produce one cycle in its output signal for each two cycles appearing in the flip-flop 49 output signal. Thus, each flip-flop stage effectively counts or scales down, by a factor of two, the signal produced by the previous flip-flop and two serially-connected flip-flops effectively scale-down by four, the signal applied to the first stage, while three flip-flop stages produce a count or scale-down of eight between its input and output connections.

Accordingly, the output of flip-flop 411 will comprise a square wave of 61.47 kc. frequency, or one-eighth of the exciting 491.76 kc. input frequency applied to the input of scale-of-eight counter 48. This output signal is passed through a cathode follower 412, employed for impedance-matching purposes, and the output of follower 412 is applied to a level control potentiometer 413 and also to the input of another scale-of-eight binary counter 420. The movable arm of potentiometer 413 is taken through an output circuit, generally designated 419, including a filter 414 and resistor 415 connected serially to ground. The output signal of filter 414, appearing across resistor 415, is applied through cathode followers 416 and 417 to the servo unit as the Fine reference signal and through resistor 418 to the range signal common line 47, respectively. Filter 414 is preferably of a narrow bandpass or tuned variety to extract the fundamental 61.47-kc. sine wave component from its square wave input.

Scale-of-eight counter 420 contains three serially-connected flip-flops 421, 422 and 423, and hence is identical in all respects to binary counter 48. It accordingly acts to scale down its input 61.47-kc square wave signal eight times to 7.684 kc. Its output signal is applied to the input of a scale-of-four binary counter 425 and also to an output circuit 424, similar to output circuit 419, except that its included filter circuit is designed to extract the sine wave fundamenal of the 7.684-kc. square wave output from counter 420. This sine wave output signal forms the Intermediate range signal and goes both as a reference to the servo unit and to common line 47.

Counter 425 contains a pair of flip-flops and hence scales down its input signal of 7.684 kc. to an output square wave of 1.921 kc. This output signal is taken through an output circuit 426, similar to circuits 416 and 422, except that its filter extracts the fundamental sine wave component of the 1.921-kc. square wave applied to it. The signals produced by output circuit 426 go, as formerly, to the servo unit as a Coarse reference signal and to the range signal common line 47 for linear mixing with the other range signals.

The final signal required from the frequency divider is the Very Coarse signal of .1921-kc. frequency. This requires a scale down of ten from the preceding stage. This is accomplished by applying the 1.921-kc. square wave signal frequency produced by binary counter 425 into a ring-of-five divider circuit 430. Circuit 430 includes five flip-flops and may be constructed in a manner taught in the above referred to article in the May 1949 issue of the Electronics magazine. Briefly, the ring-of-five divider in the referred to article includes five flip-flops whose tube cathode circuits are so connected that four of the five flip-flops will always be in one conduction state while the fifth will be at a different or odd conduction state. Each negative input signal applied to the divider causes the odd flip-flop conduction state to step one stage down the ring in a left-to-right manner. Hence, the final flip-flop of a chain will, for every five complete cycles made by the input signal, undergo one complete cycle excursion.

Hence, flip-flop 431, connected to the output terminal of divider 430, will be triggered at the output rate of the divider, or .3842 kc., with a result that its output signal will form a square wave of half that frequency, or .1921 kc., the Very Coarse signal frequency. This output signal is passed through a typical output circuit 432 for filtering and impedance matching and serves as the Very Coarse reference signal to the servo unit and as a range modulating signal on line 47.

Finally, common line 47, containing the linearly-mixed range-modulation signals, is connected to a level control potentiometer, in turn, connected to cathode follower 434. The output signal of follower 434, appearing on its output conductor 435, is applied as an input signal to the transmitter unit, shown and described in connection with FIGURE 5.

II. *Data Transmitter*

In FIGURE 5 is illustrated the data transmitter section of a DMU station according to the present invention. As stated earlier, the purpose of the data transmitter section is to frequency-modulate the range signals derived from the range signal generating section on a carrier signal, and power amplify the modulated carrier signal for transmission to the transponder unit. This data transmitter section is composed of three major units, the exciter-driver unit 51, an automatic frequency control unit 52 and an output unit 53. Exciter-driver unit 51 includes serially-connected cathode follower 56, a reactance tube 57, a modulator-oscillator 58, a buffer amplifier 59 and, finally, and R.-F. amplifier 510. Automatic frequency control section 52 includes a crystal-controller oscillator 512 coupled to one input of a mixer 511, the other input of mixer 511 being coupled to the output terminal of buffer amplifier 59. The output signal of mixer 511 is applied serially through a voltage amplifier 513, a discriminator drive amplifier 514 and a frequency discriminator 515. The output signal of discriminator 515 is applied as one input signal to cathode follower 56. Output section 53 includes a serially-connected frequency tripler 516 and a power amplifier 517. The input signal to tripler 516 is derived from amplifier 510 and the output signal from power amplifier 517 is applied to duplexer 32, shown earlier in FIGURE 3.

Considering now the transmitter operation, the cathode follower circuit 56 receives as its input signals, the linearly-mixed five A.-C. range signals on line 435 from the range signal generator of FIGURE 4 and a D.-C. signal derived from discriminator 515 of section 52. Follower 56 serves to mix the two signals and act as an impedance-matching device between its two input signal sources and reactance tube 57. As will be shortly shown, the magnitude and polarity of the D.-C. signal from discriminator 515 is directly related to the direction and magnitude of the center frequency drift occurring in the output signal of oscillator 58. The instantaneous reactance presented by reactance tube 57 to modulator-oscillator 58 determines the instantaneous frequency of modulator-oscillator 58. Hence, the A.-C. and D.-C. signals applied to reactance tube 57 will act as a double control on the output frequency of modulator-oscillator 58. In particular, the D.-C. signal component applied to reactance tube 57 serves to control the center frequency of oscillator 58 at a constant frequency of 82.83 megacycles. On the other hand, the A.-C. input signal will act to cause the center frequency to deviate instantaneously in accordance with its instantaneous value, with the result that the output signal of oscillator 58 will be frequency-modulated by the range signals. As will be appreciated by those skilled in the art, a filtering action is inserted in the feedback loop from discriminator 515 in order that only drifts in the center frequency, as opposed to the frequency-modulated components, be corrected by the D.-C. component. Buffer amplifier 59 acts both to amplify the output signal of oscillator 58 and to isolate it from impedance variations of later sections. R.-F. amplifier 510 acts to amplify still further the signal from amplifier 59.

As stated previously, automatic frequency control section 52 acts to maintain the center frequency of the exciter-driver section signal at a constant value of 82.83 mc. This is accomplished by deriving a portion of the exciter-driver section signal and mixing it, in mixer 511, with a 72-megacycle frequency signal derived from an accurate frequency source, such as crystal-controlled oscillator 512. The output of mixer 511 is tuned to the frequency difference between 72 megacycles and 82.83 megacycles, or 10.83 megacycles, and this signal is, in turn, amplified by amplifier 513 and discriminator drive amplifier 514 for meeting respective voltage and power-matching requirements. Frequency discriminator 515 is designed to have a cross-over frequency of 10.83 megacycles. Consequently, it will produce a D.-C. voltage which varies in accordance with the frequency deviation of the 10.83-megacycle signal applied to its input terminal, which in turn, will correspond to drifts in the 82.83-megacycle signal produced by modulator-oscillator 58. This D.-C. signal, as stated earlier, in being applied through cathode follower 56 to reactance tube 57 produces variations of its reactance which act to maintain the oscillator 58 center frequency at the 82.83-megacycle value.

Frequency tripler 516 triples the 82.83-megacycle signal, applied to its input terminal, to produce an output signal of 248.5 megacycles. This may be done by operating tripler 516 as a highly-overdriven or class C amplifier and tuning its output plate circuit to the third harmonic of the fundamental input frequency. This final tripled frequency is then applied to power amplifier 517, the output of which is coupled, in FIGURE 3, to the ground antenna 33 through duplexer 32.

III. *Transponder*

Figure 6:
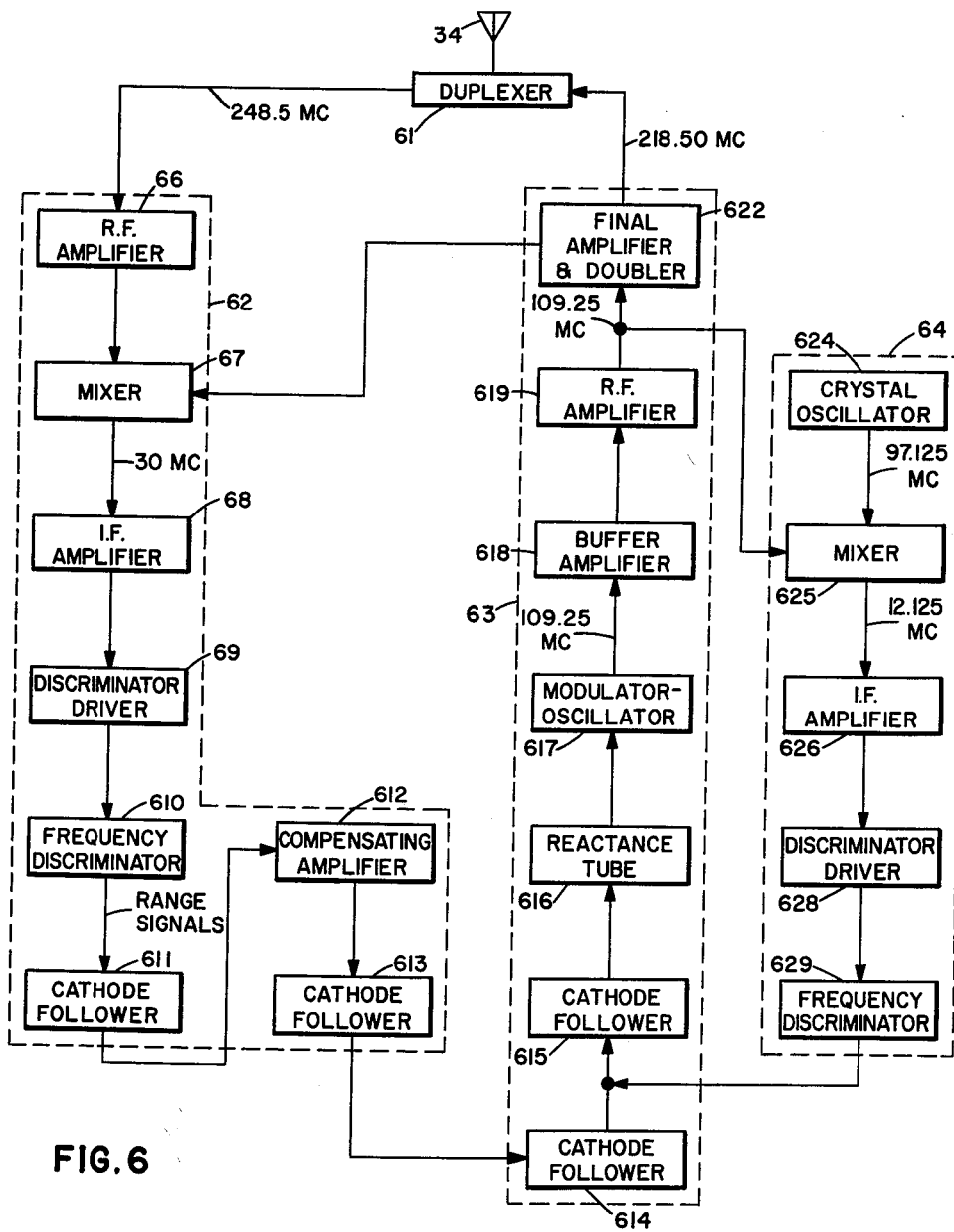
FIGURE 6 is a block diagrammatic representation of the transponder carried by the target vehicle.

The ground-transmitted signal, comprising a 248.5 megacycle carrier signal frequency-modulated by the five range signals, will be intercepted by the transponder, demodulated and a transponder carrier signal of a 218-megacycle frequency produced and then frequency-modulated by the range signals for retransmission to the ground station. A detailed schematic diagram of the transponder circuitry is illustrated in FIGURE 6. The circuitry is broken into three major units. The signal received by antenna 34 is fed through a duplexer 61 into a receiver indicated at 62. The output of the receiver is applied to a transmitter 63, whose output signal is coupled back into duplexer 61. An automatic frequency control (AFC) unit 64 is coupled across transmitter unit 63.

Considering now the receiver, transmitter and AFC units in more detail, receiver unit 62 includes an R.-F. amplifier 66 receiving the signal from duplexer 61. The output signal of R.-F. amplifier 66 is fed as one input signal to a mixer 67. The output signal of mixer 67 is serially-passed through an I.-F. amplifier 68, a discriminator driver 69, a frequency discriminator 610, a cathode follower 611, a compensating amplifier 612, and a cathode follower 613. The output signal of follower 613 constitutes the output signal of the receiver unit and is applied to cathode follower 614, within the transmitter section. The output signal of follower 614 is serially-passed through a cathode follower 615, a reactance tube 616, a modulator-oscillator 617, a buffer amplifier 618, an R.-F. amplifier 619, and into a final amplifier and frequency doubler 622. The AFC unit 64 includes a crystal oscillator 624 driving one input terminal of a mixer 625, the other terminal of the mixer receiving the output signal of amplifier 619 within the transmitter section. The output signal from mixer 625 is coupled, in turn, through an I.-F. amplifier 626, a discriminator driver 628 and, finally, into a frequency discriminator 629. The output signal from unit 64 is taken from discriminator 629 and applied to cathode follower 615.

In considering the operation of the transponder circuitry, it will be recalled that the transmitter section on the ground provides a 248.5-megacycle output carrier signal. This is received via antenna 34 and duplexer 61 into the receiver unit 62, and amplified by amplifier 66. Now the output of the transponder, transmitted to the ground station, is of a 218.50-megacycle frequency. A portion of this transponder output signal is derived from the final amplifier and frequency doubler stage 622 and is mixed in mixer 67 with the incoming, ground-transmitted signal of 248.5 megacycles to provide an I.-F. signal of 30-megacycle frequency. This 30-megacycle I.-F. signal is amplified, and then demodulated by frequency discriminator 610 into the five range signals. Compensating amplifier 612 is employed to selectively amplify the five range signals. This may be done, for example, by employing five tuned circuits, respectively tuned to the five range signal frequencies. Any phase shift incurred by the range signals in passing their tuned circuits will be stabilized by the feedback technique employed, as explained later.

Consider now, for the moment, the operation of automatic frequency control unit 64 in conjunction with the transmitter unit. Crystal-controlled oscillator 624 produces a constant output frequency of 97.125 megacycles. This is mixed with a transmitter signal frequency of 109.25 megacycles, obtained just prior to a final frequency doubling operation, to yield the final output frequency of 218.50 megacycles. Mixer 625 accordingly produces, as its output signal, the frequency difference of the two signals applied to it, or 12.125 megacycles, in turn, employed as the I.-F. frequency in this AFC section. This I.-F. frequency is amplified, and then converted into a D.-C. signal by frequency discriminator 629 whose polarity and magnitude, in turn, represent the offset of the transmitter carrier signal from its 109.25-megacycle center frequency.

On the other hand, the signal supplied from the receiver section constitutes the demodulated range signal frequencies which are to be frequency modulated on the transmitter's carrier signal. This signal, along with the D.-C. signal from discriminator 629 accordingly control reactance tube 616 and oscillator 617 in the manner explained previously for the similar combination in the ground transmitter section with the result that the range signals are frequency-modulated on a carrier signal of constant frequency characteristics.

After appropriate amplification by stages 618 and 619, final amplifier and frequency doubler 622 acts to further amplify this frequency-modulated signal and double its frequency. This may be accomplished, as stated previously for the ground station transmitter section, by overdriving the final tube and tuning its plate circuit to, in this case, the second harmonic of the input fundamental. The output signal is then coupled through duplexer unit 61 to antenna 34 for retransmission to the ground.

Since range determination will be performed by comparing the phase of the transmitted and received signals, it is manifest that the transponder circuitry must possess absolute phase stability and introduce no appreciable phase shifts on the range signals during their excursion to and from the transponder antenna.

Many factors, which at first glance might make these transponder circuit requirements seem difficult, if not impossible to achieve, include circuit detuning due to component drift with time, voltage or temperature variations, changes in discriminator phase transfer functions with tube gain changes, center frequency tuning variations with a varying automatic gain control voltage, etc. Any of these factors, taken separately or in combination, will cause phase shifts of varying magnitudes to occur in the range signals as they pass through the various circuit portions.

It will also be appreciated that the same phase shift factors will be similarly encountered in the receiver section of the ground station DMU, since the transponder transmitted range signals must be received at the ground, amplified, etc., and demodulated into the original range signals. Any phase shifts incurred in their passage through the various portions of the receiver circuitry will also alter their distance information. Hence, it is mandatory that both the transponder and ground receiver circuitry introduce no phase shifts in the range signals of a magnitude approaching the distance-measuring accuracy desired for the whole system, which is in the order of a few feet.

Elimination of range signal phase shifts is achieved in both transponder and receiver sections, in accordance with the present invention, by employing slightly different, although generally similar, circuit techniques. Rather than describe them both in detail, the receiver technique will be set forth in detail, and the differing transponder technique explained thereafter. Accordingly, in FIGURE 7 is shown, in block schematic form, the principal portions of the receiver section circuitry, set forth primarily for illustrating the manner of acheiveing constant, zero degree range signal phase shift passing therethrough. In the figure, the ground antenna 33 is coupled through duplexer 32 into a mixer 73. The output signal of mixer 73 is serially fed through an I.-F. amplifier 74, a frequency discriminator 75, a compensating network 76 into the input of a local oscillator and reactance tube combination 77. The output signal of combination 77 is applied as the other input signal to mixer 73, while the receiver output signal is taken from the output terminal of network 76.

In the figure, the term $K_1G_1$ represents the complex transfer characteristics, i.e., gain and phase shift, of I.-F. amplifier 74, $K_2G_2$ of frequency discriminator 75, $K_3G_3$ of compensating network 76, and $K_4G_4$ of the oscillator and reactance tube 77. Now, the transfer function of the loop may be written as:

$$\frac{K_1G_1K_2G_2K_3G_3}{1+K_1G_1K_2G_2K_3G_3K_4G_4}$$

By making the open circuit gain, that is, the gain of all serially-connected circuits without closing the connection of oscillator and reactance tube to mixer 73, much greater than unity for the range frequencies, the circuit transfer function reduces to:

$$KG = \frac{1}{K_4G_4}$$

Hence, the effective circuit transfer function, i.e., its gain and phase characteristics, is actually determined by the gain and phase characteristics of the reactance tube and local oscillator combination portion of the circuit. The desired phase stability is partially achieved, in combination 77, by employing broadband circuits, since points of maximum phase shift are associated with narrowband, highly-resonant circuits near their point of resonance. On the other hand, the phase shift characteristics of broadband circuits are substantially constant over the broad-topped center portion of their pass band. Also, the phase stability of the local oscillator and reactance tube circuitry is enhanced by employing good engineering practice, i.e., carefully selected and matched components, temperature control of its package, etc.

The phase stabilization techniques employed may be explained from a different standpoint from that set forth above. The signal from oscillator and reactance tube 77 is applied as a degenerative feedback signal, to mixer 73 is applied as a degenerative feedback signal, of substantial relative magnitude. A degenerative loop, as is known, acts to stabilize amplitude and phase of the passed signal, the degree of stabilization thus effected being a direct function of the amount of degeneration. In the present circuit, a heavy amount of degeneration is employed to provide a high degree of stabilization. Further, the feedback circuits are themselves provided with substantial phase stability characteristics to insure overall stability.

The transponder circuitry is also arranged to provide an effective zero magnitude range signal phase shift by a degenerative loop similar to the receiver circuitry just described, but without including a circuit section, such as local oscillator and reactance tube combination 77, effectively outside the loop. In particular, referring again to FIGURE 6, it is seen that the transponder feedback loop is closed directly between the output and input signals and hence lacks any circuit elements having the "open ended" phase stability requirements of combination 77, as explained above.

IV. *Receiver*

In FIGURE 8 is shown, in schematic form, the receiver section of the DMU station according to the present invention. It includes three major units, an I.-F. unit 80 coupled to an output unit 81, and a local oscillator unit 82 coupled between the output and I.-F. units.

In particular, I.-F. unit 80 includes an R.-F. amplifier 84 receiving the transponder transmitted signal as received through antenna 33 and duplexer 32. The output signal of amplifier 84 is coupled to one input terminal of a mixer 85, the other input terminal of mixer 85 receiving the output signal of local oscillator 82. The output signal of mixer 85 is passed serially through an I.-F. amplifier 86, a limiter 87, a frequency discriminator 88, and a cathode follower 89 to form the output signal of the I.-F. section. Output unit 81 comprises a serially-connected compensating amplifier 802 and cathode follower 803. The amplifier 802 input terminal is connected to the output terminal of cathode follower 89.

Local oscillator unit 82 includes a serially-connected cathode follower 804, a reactance tube 805, a modulator-oscillator 806, a buffer amplifier 807, an R.-F. amplifier 808 and a frequency tripler 809. A feedback circuit, comprising an R.-F. amplifier 810 and a frequency discriminator 811 is coupled between the output terminal of amplifier 808 and one input terminal of cathode follower 804. The other input terminal of follower 804 is coupled to the output terminal of follower 803 in output unit 81. The output signal of this DMU receiver section appears on the output terminal of cathode follower 803 and is coupled to the servo readout section, to be subsequently described.

The input signal to the receiver will comprise the 218.5-megacycle transponder transmitted signal as frequency modulated by the five, phase delayed, range signals. Since local oscillator 82 is servoed to produce a stable 172.5-megacycle output signal, in a manner to be shortly explained, output signal of mixer 85 will comprise the frequency difference between the local oscillator frequency and the transponder frequency, or 46.5 megacycles. This I.-F. frequency, after amplification by amplifier 86 and limiting in limiter 87, is demodulated by discriminator 88 into the five range signals. These range signals are selectively amplified by compensating amplifier 802, whose characteristics correspond to those of a similar amplifier 712 shown in the transponder circuit of FIGURE 7.

Considering now the operation of local oscillator unit 82, modulator-oscillator 806 is servoed to a mean center frequency of 57.5 megacycles, by the D.-C. voltage produced by frequency discriminator 811, in the manner previously explained for similar circuitry in the ground transmitter section and transponder. The five range modulation signals are likewise applied through follower 804 to reactance tube 805 to frequency modulate the output signal of oscillator 806. This frequency-modulated signal is tripled in frequency by frequency tripler 809 to an output frequency of 172.5 megacycles. This 172.5-megacycle signal is mixed with the incoming 218.5-megacycle signal from the transponder to produce the I.-F. signal frequency of 46.5 megacycles, as formerly noted. The five range signals, phase delayed from the originally produced range signals by an amount corresponding to the distance traveled from the ground station antenna to the transponder and back, appear on output line 800 of this receiver section. Line 800 is coupled to the servo readout section in a manner to be shortly shown.

V. Servo Readout Section

The input data to the servo readout section of a DMU station according to the present invention, comprises the five range signals originally produced by the range signal generator and the same five phase-shifted range signals, as demodulated by the receiver section. The servo unit employs this input signal information to produce unambiguous output data in analog form of the scalar range from the ground station to the target vehicle. This servo unit comprises five generally similar sections or channels, one for each range signal frequency, which are selectively actuated to deliver driving signals to a single servo motor. A feedback loop, in turn, is coupled back from the motor to each section through a gear train and resolver unit. The operation established is that of driving the resolver in each channel to null, at which time a scale and associated pointer in each channel give, in combination, a channel range reading. The readings, taken together, of all channels give the target slant range.

FIGURE 9 is a block diagrammatic representation of a typical channel in combination with the motor drive and feedback arrangement. It is given here to illustrate broadly the principles involved in the readout technique according to the present invention. Subsequent figures reveal more detailed information of the particular channels involved and the procedures employed for interconnecting all five channels in an operative combination to achieve complete readout information.

In FIGURE 9, the five range signals appearing on output line 800 of the receiver section are passed through a filter 91, an amplifier 92, into one input of a phase discriminator 93. A reference range signal, corresponding to the range signal filtered by filter 91 is received from the appropriate output circuit of the range signal generator, FIGURE 4, and is passed through an amplifier 96 into a resolver, shown schematically at 98. The output signal taken from resolver 98 is supplied to the other input of discriminator 93 whose output, in turn, is applied to a balanced modulator 99. The output of modulator 99 is phase shifted 90° by network 910, whose output signal, in turn, is applied across one winding of a servo motor, such as a two-phase variety shown at 912. An A.-C. signal, of 400 cycles for example, employed for reference signal purposes, is applied across the other winding of servo motor 912 and to the other input of modulator 99. The output shaft 914 of the servo motor drives a gear train, shown schematically at 915, from which the resolver shaft 916 of resolver 98 is driven.

Consider now, the operation of this single channel and motor combination. Motor 912 is a typical two-phase servo type and as such will include two stator windings wound at right angles, or 90° phase difference, to each other. One of these windings is excited continuously by an A.-C. input signal and the other winding by the output signal of modulator 99, after being shifted 90° in phase. Since modulator 99 will respond to the polarity of the D.-C. signal applied to it from discriminator 93 for passing a 400-cycle output signal, either in phase with, or 180° out of phase with, the reference signal appearing on lines 913, the signal from 90° phase shift network 910 will either lead or lag this same reference signal by 90°. This phase-shifted signal, in being applied to motor 912, will cause its shaft to rotate in one direction or the other based on whether it leads or lags the reference signal. When no signal output is produced by the modulator, no signal is applied to this second motor winding and no shaft rotation thereby produced.

Consider now the circuit operation up to the inputs of discriminator 93. The reference and receiver range signals applied to this typical servo channel will, in general, be displaced in phase relative to each other. The reference range signal is applied to resolver 98, a pair of typical internal resolver connections being shown later in FIGURES 10a and 10b. Regardless of the particular connection employed, resolver 98 will produce an output signal which is phase-related to its input signal by an amount corresponding to the displacement of its shaft, driven by gear train 915 from motor 912. The phase of the signal resulting from the resolver shaft displacement is compared with the receiver range signal phase in phase discriminator 93 and the polarity of the D.-C. output of the discriminator will, as stated before, represent the phase difference between its two input signals.

The operation of servo motor 912 based upon the form of output signal from discriminator 93 has been previously described. Now, the phase relationships formed by the interconnections between the resolver windings, the discriminator input and output, the modulator and motor windings are such that shaft 914 will be driven in a degenerative manner, that is, resolver 98 will be driven in such a direction as to reduce the phase difference between its output signal and the incoming signal from the receiver. By this action, null will be attained when the phase of the two signals applied to discriminator 93 are equal and upon this occurrence, motor 912 will consequently stop. When this condition is reached, the displacement of shaft 916 of the resolver is directly related to the phase difference between the two incoming channel signals and a pointer and scale arrangement 918 will give a direct reading of the range indicated by the channel. It will be appreciated that the degree of gear-down afforded shaft 916 by the gear train must correspond to the particular range channel in question and that the scale associated with the pointer will be calibrated according to the system of measurement used and the portion of the over-all range given by its associated channel. More details on this aspect of the servo readout section will be presented later.

Although all of the five servo range channels are basically similar, certain differences between them do exist by reason of the wide frequency range, between 491.76 kc. to .1920 kc., of their operating signals. Accordingly, in FIGURE 10a is illustrated what is termed the resolver portion of the Very Fine reference signal channel while in 10b is indicated the resolver portion of the Very Coarse signal channel.

Considering now in FIGURE 10a, the resolver portion of the Very Fine signal channel, the mixed range signals from the range signal generator are applied to the input of a high-pass filter 102, the output signal of which, along with the Very Fine reference signal taken from the circuitry of FIGURE 4 are applied as input signals to a frequency converter section 103. In particular, the reference signal and the filter output signal are applied to one input terminal of each of a pair of cathode follower mixer circuits 105 and 106, respectively. The other input terminals of the two follower circuits are coupled to the output terminal of an oscillator 108, stabilized at a 496.76-kc. frequency. The output signals of followers 105 and 106 are coupled through amplifier 109 and low-pass filter 111, and amplifier 110 and low-pass filter 112, respectively. The output signal of filter 111 is amplified by an amplifier 114 and then passed into a ±45° phase-shifting network 115. The two output signals from phase shifter 115 are applied to cathode follower circuits 116 and 117, respectively, whose output signals, in turn, go through resolver drive amplifiers 118 and 119, respectively, and from there to the two stator windings of the Very Fine resolver 120. The resolver signal, taken from one of its rotor windings, is amplified by discriminator drive amplifier 124 and applied to one input terminal of a phase discriminator 126. Finally, the output signal from low-pass filter 112 in frequency converter 103 is taken through a discriminator drive amplifier 125 to the other input terminal of phase discriminator 126. The output signal of phase discriminator 126 constitutes the output signal of this Very Fine servo channel resolver portion.

In operation, filter 102 is designed to pass only the 491.76 kc. component of the mixed ranging signals coming from the receiver section. It is particularly designed with a flat bandpass characteristic so as to introduce no phase shift in the filtered signal passing through it. Since the 491.76-kc. frequency of the Very Fine reference signal is too high to be coupled directly into a resolver, the output signal frequency of 496.76 kc. of oscillator 108 is employed to reduce, by heterodyning action, this signal frequency to 5 kilocycles. Since the single output signal of oscillator 108 is beat with both the reference and the delayed range signals, any phase shifts or frequency drifts caused by its operation will affect both signals equally and hence introduce no errors in the final phase difference measurement. Low-pass filters 111 and 112 serve to pass only the difference frequency of 5 kc. and effectively block the higher frequency mixing components. Phase shifting network divides the 5-kc. reference signal into +45° and −45° phase-related signals for application to the two stator resolver windings. By dividing the reference signal into a pair of 90° phase-differing signals, they may be simultaneously applied to the two 90° displaced stator windings of the resolver and each have identical phase couplings to the rotor windings.

The operation of the remaining portion of this resolver circuitry is similar in all respects to the corresponding circuitry shown in FIGURE 9 as explained previously through the phase discriminator 93 in that figure. It may be noted that the particular resolver connections shown, which differ from the resolver connections of FIGURE 10b, make it insensitive to the velocity of the resolver shaft rotation while yet retaining linear phase shifting characteristics.

Referring now to FIGURE 10b, there is shown the resolver portion of the Very Coarse channel of the servo readout section. The Coarse and Intermediate channels are identical to the Very Coarse portion shown while the Fine frequency channel shows similarity to both the Very Fine and the Very Coarse in a manner to be shown later in FIGURE 11. The mixed range signals are passed through a filter 130, amplifier 131 and discriminator driver amplifier 142 to one input terminal of a phase discriminator 144, corresponding to discriminator 93 in FIGURE 9. The Very Coarse reference signal is applied through a resolver drive amplifier 136 across one rotar winding of resolver 138. A resistor 139 is connected in series with one stator winding of the resolver while a capacitor 140 is connected in series with the other stator winding. The stator windings with the resistor and capacitor are connected in parallel, one of their mutual junctions being connected to ground and the other mutual junction being connected to the input terminal of a discriminator drive amplifier 143. The output signal of amplifier 143 is applied as an input signal to the other input terminal of phase discriminator 144.

The operation of the FIGURE 10b circuit is similar to that described in FIGURE 9 except that, in detail, the resolver, although connected to give a linear phase shift with shaft displacement, will, upon resolver shaft rotations, act to either add or subtract in accordance with the shaft velocity and depending on its direction of rotation, to the output frequency applied to discriminator 126. This would normally produce an erroneous output reading except that a different resolver connection is employed in the Very Fine channel, as shown in FIGURE 10a, which is insensitive to shaft rotation. Then, by giving, as later shown, the Very Fine channel the final, or accurate readout control, this type of resolver connection, employed in the remaining channels, does not affect the final range accuracy.

Figure 10:
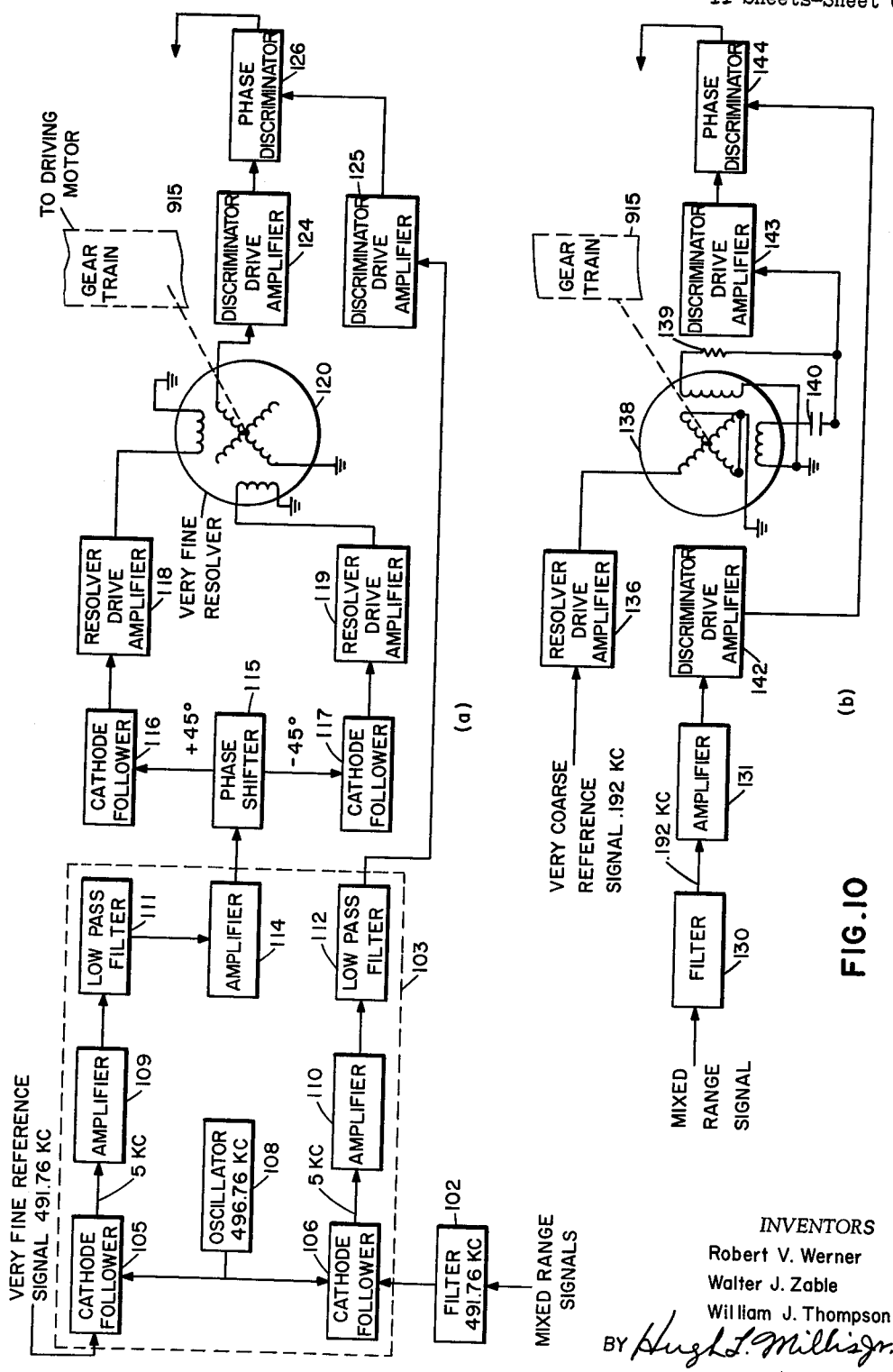
FIGURE 10a and 10b show portions, in block diagrammatic form, of the Very Fine and Very Coarse servo readout channels, respectively, of a distance-measuring unit.
Figure 11:
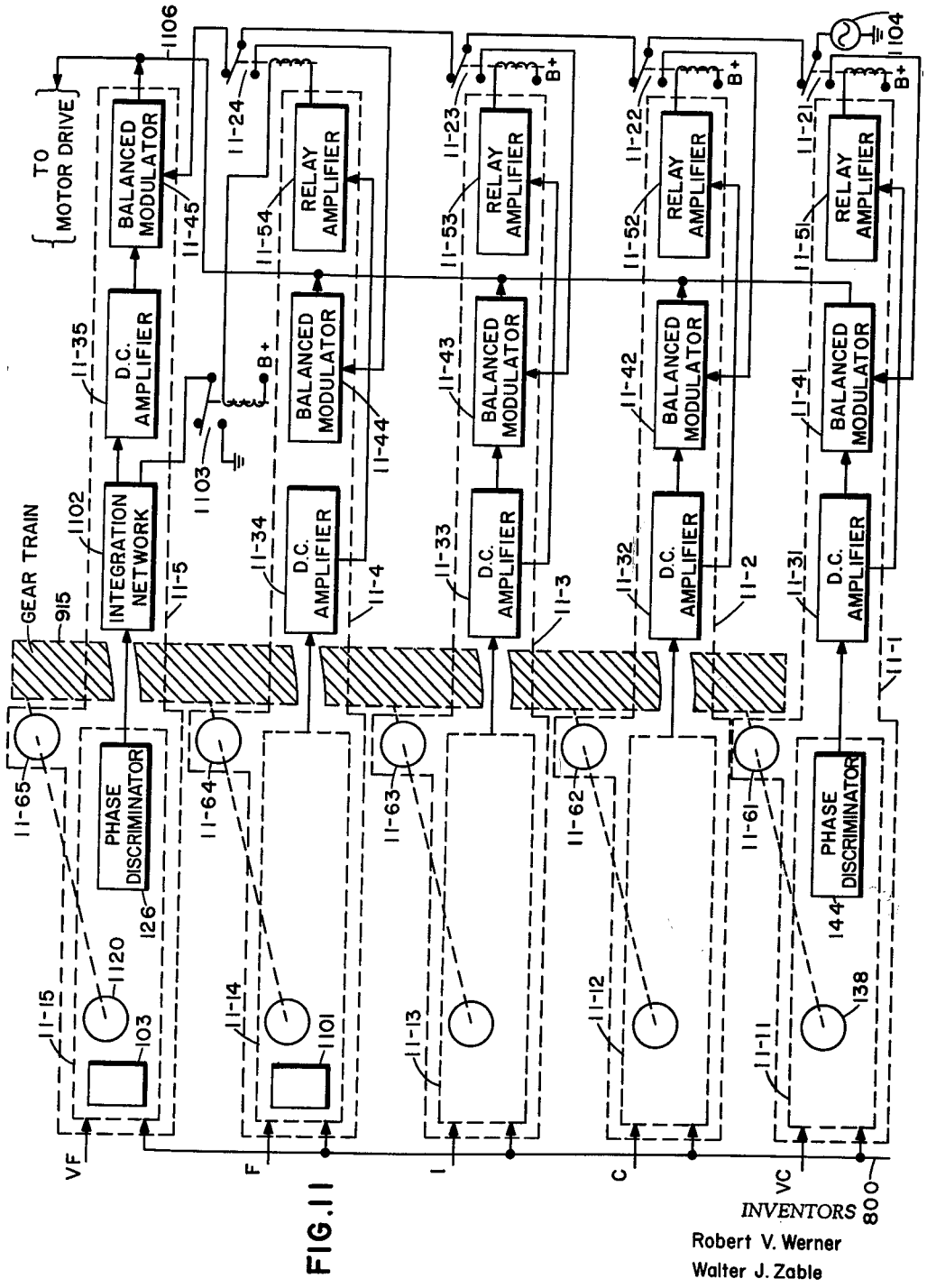
FIGURE 11 is the circuit diagram, partly in block diagrammatic and partly in schematic form, of the major portions of the five channels in the servo readout section of a distance-measuring unit.

In FIGURE 11 are shown additional details of the readout servo channels. In particular, the servo channels are blocked in at 11-1, 11-2, 11-3, 11-4 and 11-5, corresponding to the Very Coarse, Coarse, Intermediate, Fine, and Very Fine range frequencies, respectively. Channel 11-1 includes resolver unit 11-11, corresponding to the circuitry shown and described in FIGURE 10b. Its output signal, taken from phase discriminator 144 is applied to a D.-C. amplifier 11-31, the output signals of which are applied to a balanced modulator circuit 11-41 and a relay amplifier 11-51, respectively. The other input and a relay amplifier 11-41 is taken from the lower terminal of a two-position relay indicated at 11-21, the relay coil of which is driven by relay amplifier 11-51. The output signal of modulator 11-41 is applied to a common modulator line 1106. A detailed circuitry embodiment of a typical D.-C. amplifier, balanced modulator and relay amplifier corresponding to their combination in channel 11-1, or any of the remaining servo channels, is shown later by way of example, in FIGURE 13.

Servo channels 11-2 and 11-3 are identical in all respects to channel 11-1 and are correspondingly associated with a pair of relays 11-22 and 11-23, respectively. The relay arm of relay 11-21 is connected to a source of alternating current potential, such as a 400-cycle source, as indicated at 1104. The upper relay contact point of relay 11-21 is connected to the movable arm of relay 11-22 and the upper relay contact of relay 11-22 is connected, in a similar fashion, to the movable switch arm of relay 11-23.

The upper contact of relay 11-23 is connected to the movable arm of relay 11-24, associated with the Fine signal channel. The Fine signal channel 11-4 is similar to channel 11-1, as described, except that it includes a frequency converter section 1101 corresponding to the frequency converter section 103 of the Very Fine channel 11–5, as shown and described in FIGURE 10a. In particular, converter section 1101 will employ a crystal oscillator, corresponding to oscillator 108 in FIGURE 10a, but preferably operating at a frequency of 65.47 kc., or 4 kilocycles higher than the incoming Fine reference signal of 61.47 kc. Hence, the resolver section 11–14 of channel 11–4 will operate at a reference frequency of 4 kc. rather than the 5-kc. of resolver section 11–15, the different frequencies being provided for alleviating possible cross-talk and intermodulation difficulties.

The Very Fine range channel 11–5 differs from the preceding channels in that it includes an integrating network 1102 connected between the output of its resolver section and its D.-C. amplifier 11–35. This integrating network will be shown later in detail in FIGURE 14. Also included with the Very Fine channel is a relay 1103 whose movable contact arm is connected to one output terminal of the integrator network and whose lower fixed contact is connected to ground. The coil of relay 1103 is series-connected with the relay coil of relay 11–24, the two being driven by relay amplifier 11–54 in the Fine reference channel 11–4. Finally, the upper contact point of relay 11–24 is connected to one input terminal of balanced modulator 11–45 in section 11–5.

Shown again in schematic form is gear train 915, with shaft coupling interconnections between the resolvers in each of the resolver portions and its internal gearing arrangement. A series of dial and pointer arrngements for visual readout purposes, one for each section, are indicated schematically at 11–61, 11–62, 11–63, 11–64 and 11–65.

Figure 12:
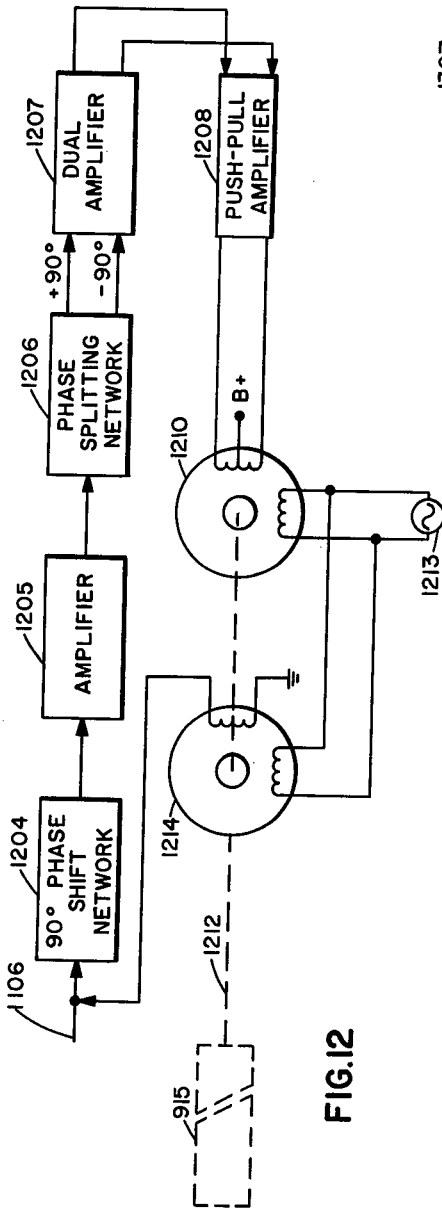
FIGURE 12 is a circuit diagram, in block schematic form, of the servo motor drive unit of the servo readout section of a distance-measuring unit.

Before proceeding with a description of the operation of the FIGURE 11 circuitry, reference is made to FIGURE 12, which shows, in block schematic form, the servo motor and drive section which operates on the output signal furnished by output line 1106 of the servo channel combination of FIGURE 11 and, in turn, drives the various channel resolvers for feedback purposes. The input signal on line 1106 is passed serially through a 90-degree phase shift network 1204, an amplifier 1205, a phase-splitting network 1206, a dual amplifier 1207 and a push-pull amplifier 1208. The output of amplifier 1208 is applied as a quadrature voltage to one stator winding of a conventional two-phase servo motor 1210. The B+ voltage required for its push-pull excitation is applied to a center tap in the motor 1210 stator winding. The shaft 1212 of motor 1210 is coupled to the rotor of a rate generator 1214 and to gear train 915. The other stator winding of servo motor 1210 and a corresponding stator winding of rate generator 1214 are coupled to a source of alternating current potential, indicated at 1213, assumed for the purposes of the present example to produce a 400-cycle output signal frequency. The other stator winding of rate generator 1214 is coupled back to the input of phase shift network 1204 as a degenerative feedback signal.

Consider now the operation of the servo unit of FIGURE 11, in combination with the motor drive circuitry of FIGURE 12. First of all, it will be recalled that a typical channel in direct connection with the motor and motor circuitry, with feedback, was shown and described in FIGURE 9. This was done to illustrate the basic operating principles involved. FIGURE 11 differs primarily from FIGURE 9 in that it includes all five readout channels with switching circuitry which selects the particular channel to be connected to the motor drive circuitry at any particular time. With a selection established and connections made, the particular channel and motor combination act as previously described. Hence, the particular features required for completing the description of the FIGURE 11 and 12 circuitry operation consist primarily of the circuit details employed for channel selection.

By way of review, it will be recalled that the phase discriminator in the resolver section of each channel will produce an output D.-C. voltage only if the position of its associated resolver shaft does not correspond to the phase difference between the transmitted and received range signals passing through its particular channel. Stated differently, if the resolver of a particular section is off of a null position, the resolver secondary will pass a portion of the applied reference signal, the amplitude of the passed signal being determined by the extent of the off-null shaft position and the polarity of the resolver output signal being either in-phase or 180° out of phase with the input signal to establish the direction of the off-null shaft position. The discriminator will reflect this resolver signal as a D.-C. potential whose magnitude is related to the amplitude of the resolver signal and of a polarity established by the particular phase of the A.C. signal. Hence, the D.-C. discriminator signal is directly related to the amount and direction away from null of its associated resolver shaft position.

Figure 13:
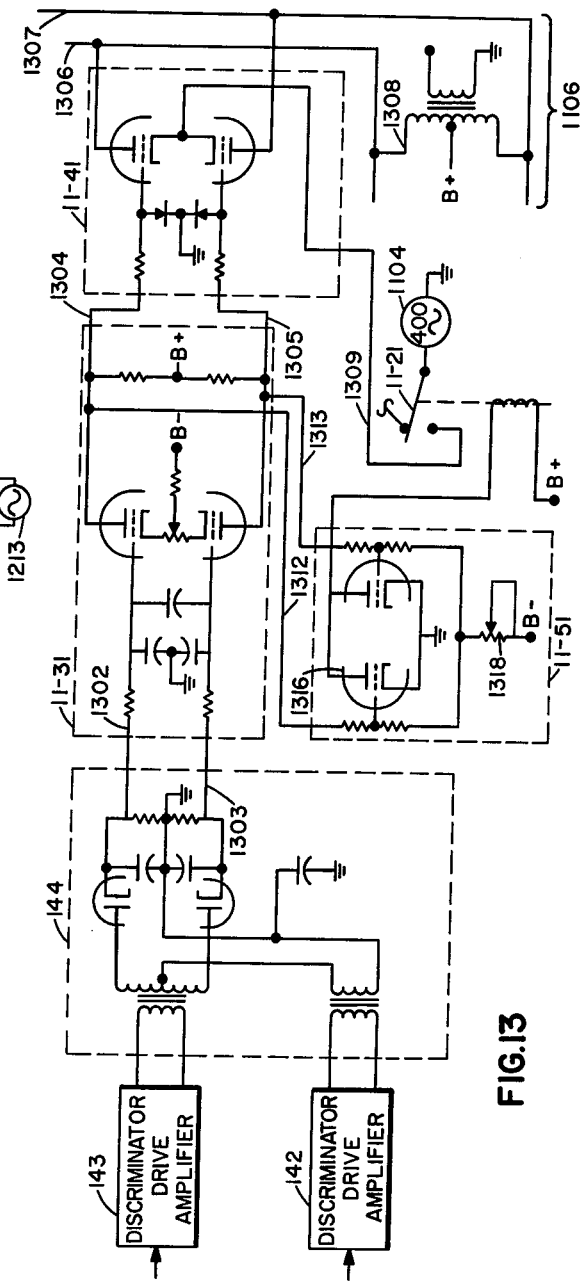
FIGURE 13 is a detailed circuit diagram of a portion of a representative channel in the servo readout section of a distance-measuring unit.

Now, for the purposes of further explanation, assume in particular that an off-null condition exists in the Very Coarse channel 11–1, so that D.-C. amplifier 11–31 receives an input signal from phase discriminator 144, its output signal being applied, as before stated, to modulator 11–41 and relay amplifier 11–51. Amplifier 11–51, later shown in circuit detail in FIGURE 13, is arranged to have a certain input threshold level, that is, an appreciable amplified output signal will be produced until a predetermined level of input signal is received from amplifier 11–31. The particular parameters of this circuit are arranged so that this threshold point corresponds to a 15-degree phase shift in the resolver output signal, which corresponds to a range reading of 64,000 feet. The reason for this will become more clear shortly, but is derived from the fact that the principal function of the Very Coarse channel is to provide ambiguity resolution rather than accurate information and further, that discrete relay switch times must be accounted for in tracking high-velocity targets in order to still obtain continuous output range data. Upon attainment of this threshold D.-C. level at the input of relay amplifier 11–51, its sharply increased output current will operate relay 11–21 with the result that its movable arm will be moved to contact the lower contact point.

Tracing now the various relay interconnection lines, it will be seen that the 400-cycle A.-C. signal from source 1104, as applied to the movable arm of relay 11–21, will be conducted to one input terminal of balanced modulator 11–41 and, as a result, a 400-cycle output placed by modulator 11–41 on modulator common line 1106. The phase and amplitude of this signal, will, as understood, be determined by the polarity and amplitude, respectively, of the actuating D.-C. signal from amplifier 11–31. In particular, the phase of this signal will be either in phase or exactly 180° out of phase with the signal from source 1104.

Tracing modulator common line 1106 into FIGURE 12, it is seen that the 400-cycle error signal carried by it, undergoes in succession, a 90-degree phase shift by phase shift network 1204, amplification by amplifier 1205, and phase-splitting into 90-degree lead and lag signals by phase-splitting network 1206. The resulting two split phase signals of 180° phase difference are then amplified in conventional fashion by amplifier 1207 and push-pull amplifier 1208 and applied as a quadrature voltage to one winding of the two-phase servo motor 1210. The shaft of motor 1210 will be consequently driven in a direction, as before explained, to drive resolver 138 through gear train 915 to reduce the output signal from discriminator 1144. Accordingly, when the phase difference is sufficiently reduced, and the D.-C. input voltage level applied to relay amplifier 11–51 is below its established threshold level, the relay coil of relay 11–21 will be de-energized and source 1104 effectively disconnected from channel 11–1.

Having considered in detail the operation of a single channel in conjunction with the motor drive circuit, taking into account the operation of its respective selection circuitry, consider now the simultaneous operation of all five channels. First of all, the relays, constituting a portion of the circuit selection equipment, are so connected that only one channel at a time can be connected to the motor drive circuitry. In particular, the specific channel having precedence will always be the one corresponding to the range signal of the lowest frequency, assuming off-null conditions are met. This can be readily observed from the relay interconnetions. For example, if the Coarse and Very Coarse channels send simultaneous energizing signals to their respective relays, the operation of relay 11–21, associated with the Very Coarse channel, will act to disconnect the 400-cycle source 1104 from the movable arm of relay 11–22 associated with channel 11–2. Hence, although movable arm of relay 11–22 is actuated to its lower position, no 400-cycle signal will be applied to its corresponding modulator unit. If now, however, relay 11–21 only should release, then the 400-cycle signal would be routed through activated relay 11–22 to modulator 11–42 within Coarse channel 11–2 and the signal from the Coarse channel then applied as a corrective drive signal to the modulator common line 1186. This signal would then represent the resolver unbalance in the Coarse channel and hence the motor shaft error in the Coarse frequency range. It will also be seen that, with relay 11–22 energized, all relays associated with the higher range frequency channels, that is, the Intermediate, Fine and Very Fine, will be isolated from source 1104 and hence incapable of passing this 400-cycle signal to the inputs of their associated modulators.

Having viewed the individual operation of a channel and motor circuit combination and the selection feature which permits only the lowest frequency channel exhibiting a predetermined magnitude of error signal to operate the motor, consider now the over-all servo system operation in which the four lower frequency channels, Very Coarse, Coarse, Intermediate and Fine, are employed for ambiguity resolution and the higher frequency channel, the Very Fine, is simultaneously employed for meeting the system readout accuracy requirements. For the purposes of this explanation, reference is made to Table II, included below, which lists the read error limits within which the various channel relays are actuated.

TABLE II

| Readout Error in Feet, between— | Channel Having Control | Wavelength in feet, of Controlling Channel Frequency (λ) |
| --- | --- | --- |
| 1,216,000–64,000 | Very Coarse | 2,560,000 |
| 64,000–16,000 | Coarse | 256,000 |
| 16,000–2,000 | Intermediate | 64,000 |
| 2,000–250 | Fine | 8,000 |
| 250–0 | Very fine | 1,000 |

In the table, the first column gives position error in feet of the over-all servo reading as subdivided into five ranges which correspond, in the second column, to the channel granted motor control. Line 1 means that whenever the motor and gear train position is in error between the limits of 1,216,000 feet, corresponding to the maximum unambiguous range capable of detection by the present system, and 64,000 feet, chosen for reasons later made clear, relay 11–21 will be actuated and channel 11–1 placed in control. This 64,000-foot limit error will be determined by the threshold level setting of relay amplifier 11–51 to incoming D.-C. signals from amplifier 12–31. When the error is reduced below this amount, relay 11–21 will release and the Coarse channel granted motor control within the limits shown on line 2, column 1 of the table. In the same way, the other lines of the table may be similarly understood.

Since the maximum unambiguous range reading possible with the Coarse channel alone is 128,000 feet, corresponding to a 180° phase shift of its 1.92-kc. modulating frequency of a 256,000-foot wavelength, the 64,000-foot switch point corresponds to a 90-degree phase shift point in its channel, which occurs mid way in its effective range reading characteristics. This of course, means that fairly substantial tolerances can be permitted in the switch-out point, i.e., 64,000 feet, of the Very Coarse channel and still obtain ambiguity-resolving characteristics from this Coarse channel.

The relay release points for the Coarse, Intermediate and Fine channels correspond to distances of 16,000 feet, 2,000 feet and 250 feet, respectively. Each of these distances represent points which correspond to mid-range or 90-degree phase shifts in the next higher frequency channel. Hence, since the Intermediate channel unambiguously resolves range up to 32,000 feet, the Coarse channel switches into it at a phase difference corresponding to 16,000 feet. By maintaining this relationship between channel switching points and channel phase shift, a maximum possible deviation of the threshold level of the relay amplifier in each channel may be tolerated before an over-all ambiguous or inaccurate readout would be obtained. Also, this relationship becomes important when high-velocity targets are being tracked, since the target position will change during the discrete relay switching times. Thus, by initiating the switching action into a channel at its mid-range point, a maximum target position change may occur during the relay switching time and the channel switched into, still retain control.

It will be noted that the Very Coarse channel controls up to 1,216,000 feet, rather than 1,280,000 feet, the previously given figure for the unambigous range of its range signal frequency of 192 cycles per second. This difference is realized by the fact that its phase discriminator will produce similar voltage magnitudes, although of opposite polarities, at two points of phase shift, one corresponding to 64,000 feet or 9°, and the other at a maximum range of 1,280,000—64,000, or 1,216,000 feet, represented by 171°. Since, as will be shown in the detailed circuitry of a typical channel D.-C. relay amplifier and other circuits in FIGURE 13, the relay amplifier is connected such that either polarity of an input D.-C. signal is capable, once its magnitude reaches the preset level, of activating the relay. Thus, whenever the range error exceeds 1,216,000 feet, the over-all system reading becomes ambiguous since relay 11–21 will be deactivated, permitting channel 11–2 servo control. For this reason, the maximum unambiguous range reading possible with the system having the particular modulation frequencies given by way of example, will be 1,216,000 feet or about 230 miles. It is, of course, apparent that auxiliary equipment may be included with the Very Coarse channel to give a positive indication whenever the target's position extends beyond the maximum range capabilities of the present system. Such equipment might, for example, include a warning light or bell activated concurrently with the Very Coarse relay amplifier by the 171° phase difference signal from the channel discriminator.

As stated earlier, servo drive motor 1210 drives the series of channel resolvers at a series of speed-reduced points through gear train 1015. The speed-reduction ratio between adjacent channel resolvers corresponds exactly to the ratio between their operating frequencies and hence, inversely to their unambiguous distance-measuring capabilities. Thus, there will be an 8:1 gear-down between the Very Fine channel and Fine channel resolvers, corresponding to the 8:1 frequency ratio between 491.76 kc. and 61.47 kc., their respective channel frequencies. In the same way, 8:1, 4:1, and 10:1 successive step-down gear ratios exist between the Fine and Intermediate, Intermediate and Coarse, and Coarse and Very Coarse channels, respectively. The gear-down, if any, existing between the motor shaft and the first resolver 1120 in the Very Fine channel, is a matter of engineering choice as determined by the size of the motor, its torque-to-inertia ratio, the servo response characteristics desired, etc.

The scale associated with the pointer attached to each resolver shaft is preferably calibrated in terms of the maximum unambiguous distance measurable by its corresponding channel. In particular, this distance may be linearly marked and indicated around the scale to, in the Very Fine channel, for example, correspond to ±500 feet, the total 1000 feet being the maximum unambiguous Very Fine channel range measurement.

Another readout version would consist of a gear-up mechanism attached to the low-speed end of gear box 1015, that is, at the Very Coarse channel point, with output shafts being taken at tap points such that complete shaft rotations would, for example, correspond to 100 feet, 1000 feet, 10,000 feet, 100,000 feet and 1,000,000 feet of range. Then, with appropriate scale divisions associated with each shaft, a readout may be taken at any time without calibrating the over-all resolver shaft readings as would be required for the case of pointer couplings to the resolver shafts.

As described earlier, relay amplifier 11-54 in the Fine channel 11-4 drives a pair of serially-connected relay coils in relays 11-24 and 1103. Whenever this relay amplifier is activated, relay 11-24 will cause the 400-cycle signals from source 1104, assuming relays 11-21, 11-22, and 11-23 are deactivated, to be applied to the input of modulator 11-44 and its output to the common modulator line 1106. Simultaneously, the movable arm of relay 1103 will be energized to its lower contact position, and the other output terminal of integration network 1102 grounded.

Although this integration network 1102 is shown in detail in FIGURE 14 and described in connection therewith, it may be stated briefly that it acts as a low-pass filter circuit to limit the bandpass characteristics of the servo motor and feedback loop. This is required to prevent excessive hunting of the motor during any intervals the Very Fine channel 11-5 is in control. Its basic operation is to smooth the output signal from the phase discriminator by storing or averaging the signal on a capacitor.

The activation of relay 1103 acts to short this smoothing capacitor to ground so that its stored signal will be completely discharged at the beginning of the next occasion the Very Fine channel assumes control of the motor. This will mean that the maximum possible loop gain will be in force whenever the Very Fine channel initially assumes control of the servo motor. This will, in turn, enable a maximum follow-up to be initiated.

At the Very Fine channel retains control with time, a charge will be built up across this smoothing capacitor and, as stated, act to limit the bandpass of the entire loop as is desirable for stability purposes.

In FIGURE 13 is shown the detailed circuitry constituting phase discriminator 144, D.-C. amplifier 11-31, balanced modulator 11-41 and relay amplifier 11-51, all in the Very Coarse channel 11-1 and taken as being illustrative of similar circuits in the remaining channels. The purpose of this detailed showing is to more fully illustrate their intercouplings, generally by a pair of connectors as needed to accommodate both positive and negative D.-C. signals, rather than the single connections shown for illustrative purposes in FIGURE 11.

In particular, phase discriminator 144 is transformer-coupled to both of discriminator drive amplifiers 142 and 143 which, from FIGURE 10, respectively amplify the receiver range signals and the output signal of resolver 138. Discriminator 144 and D.-C. amplifier 11-31 are connected by a pair of leads 1302 and 1303 while D.-C. amplifier 11-31 is connected to leads 1304 and 1305 to balanced modulator 11-41 and by leads 1312 and 1313 to relay amplifier 11-51. The output signal of modulator 11-41 is applied to a pair of leads 1306 and 1307 which, in turn, are connected across the primary of transformer 1308, whose center tap is coupled to a source of positive potential, designated B+. Transformer 1308, conductors 1306 and 1307 taken together represent the common modulator 1106 in FIGURE 11. The signal across the secondary winding of transformer 1308 represents the output signal of the servo unit of FIGURE 11 and is applied to the motor drive circuit of FIGURE 12. Finally, conductor 1309 is shown going from the lower switch point of relay 11-21 into balanced modulator circuit 11-41.

Phase discriminator 144 will operate in the usual, well-known manner, where discriminator drive amplifier 142 supplies a continuous signal of .192 kc. which is normally referred to in discriminator operation as the supply or reference signal. Amplifier 143, on the other hand, will furnish a .192-kc. signal to the discriminator whose polarity and amplitude are a function of the displacement of the resolver 138 shaft away from a null position. Discriminator 144 acts in conventional fashion to produce a push-pull type of D.-C. output on its output conductors 1302 and 1303 whose respective polarities are based on the phase difference between the two incoming signals. These two output signals are amplified in conventional push-pull fashion by D.-C. amplifier 11-31.

Relay amplifier 11-51 comprises a twin triode tube 1316 whose plates are mutually joined to one end of the relay coil of relay 11-21 and whose grids are connected midway to a pair of voltage-dividing networks, in turn, connected between leads 1312 and 1313, respectively, and one end of a potentiometer 1318. The other end of potentiometer 1318 is connected to a source of grid bias potential, indicated as B—, and also to its movable arm in order that its position will control the grid biases of triode 1316. In particular, this potentiometer will be initially adjusted so that at resolver null, both triode sections are cut off, and will remain at cut-off until a predetermined positive potential is supplied on either of leads 1312 or 1313 by D.-C. amplifier 11-31. At this time, the appropriate triode section will conduct and activate relay 11-21. This initial adjustment of potentiometer 1318 will be related to the degree of amplification furnished by D.-C. amplifier 11-31 and the output signal characteristics of phase discriminator 144 such that the conduction points of triode 1316 will correspond, as described in detail previously, to the predetermined error allowed in the Very Coarse signal channel before its cut-in point. Stated differently, potentiometer 1318 is employed to set the threshold level of amplifier 11-51 which, in turn, determines the permissible servo error before placing the servo motor control in the Very Coarse channel.

Balanced modulator 11-41 is of a typical type and receives a 400-cycle signal from source 1104, whenever relay 11-21 is actuated. This A.-C. signal is applied to the cathode connections of an included twin triode tube and this, coupled with the input signals on conductor 1304 or 1305, also responsible for the actuation of relay 11-21 through amplifier 11-51, will act to apply a signal of 400 cycles to output conductors 1306 and 1307, which, as stated previously, go to the motor drive unit through transformer 1308. On the other hand, with relay 11-21 unactivated, the 400-cycle signal is withheld from the twin triode cathode in modulator unit 11-41 and hence, no output signal will be contributed by this modulator circuit to output leads 1306 and 1307.

Figure 14:
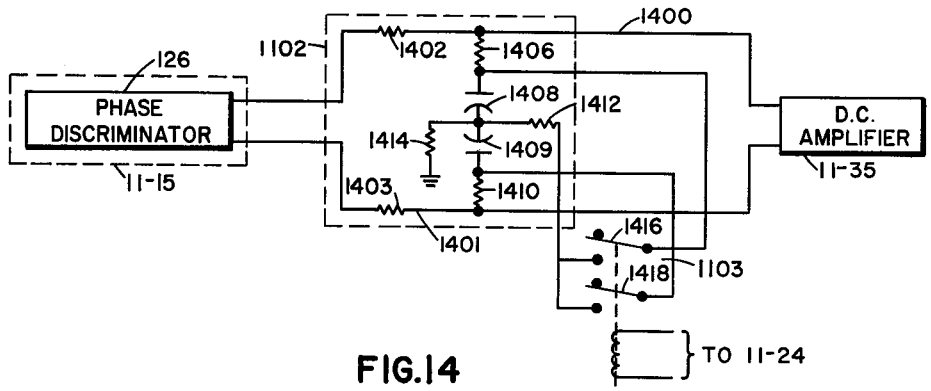
FIGURE 14 is a detailed circuit diagram of the integrating circuit in the Very Fine channel of the servo readout channel.

In FIGURE 14 is illustrated integrating circuit 1102, coupled between phase discriminator 126 and D.-C. amplifier 11-35 in the Very Fine reference channel. Integrating circuit 1102 comprises a pair of resistors 1402 and 1403, serially connected in the pair of connections, 1400 and 1401, respectively, leading directly from discriminator 126 to D.-C. amplifier 11-35 through circuit 1102. Serially-coupled, in order, between conductors 1400 and 1401 are a resistor 1406, a capacitor 1408, a capacitor 1409 and a resistor 1410. The common junction between resistor 1406 and capacitor 1408 is coupled to the movable contact arm of a relay section 1416 in relay 1103. The common junction between capacitor 1409 and resistor 1410 is, in turn, coupled to the movable relay arm of a relay section 1418 in relay 1103. The two lower contact points of relay sections 1416 and 1418 are connected together through a resistor 1412 to the common junction between capacitors 1408 and 1409. Finally, a resistor 1414 is connected between the last-mentioned common junction and ground.

As described previously in connection with FIGURE 11, relay 1103 is energized simultaneously with relay 11–24 whenever servo control resides in the Fine, rather than Very Fine channel. When this occurs, the movable arms in sections 1416 and 1418 are energized to engage their lower contact points with the result that condensers 1408 and 1409 are effectively shorted to ground through resistors 1412 and 1414 and hence completely discharged. On the other hand, whenever the Very Fine channel regains control, as will be the case upon the de-energization of relays 11–24 and 1103, assuming none of the other channel relays are energized, the movable switch arms of sections 1416 and 1418 will be in their up position with the result that capacitors 1408 and 1409 will be inserted between lines 1400 and 1401 and thereby store charges based on the potential differences between the lines.

VI. Multiple DMU Sequencing

A single distance-measuring unit has been exhaustibly shown and described. As demonstrated prior to the beginning of this description, a single DMU will locate a transponder carrying target vehicle to scalar range only; that is, the null reading presented by the multiple pointer and scale arrangements on the servo gear train will locate the target only to lie along the surface of a hemisphere whose center is located at the DMU antenna and whose radius corresponds to the reading.

If now, a pair of spaced DMU's were employed having, for the purposes of example, two different frequencies of operation, and the target to have two transponders, one for each DMU, then the information presented by the servo readouts of the two DMU's would enable the target vehicle to be located, at any instant of time, to lie along a circular line formed by the intersection of the two hemispheres associated with the two DMU antennas. Continuing the example, if three DMU stations were employed in conjunction with three associated transponder units in the target, then the exact spatial coordinates of a target at any instant of time could be determined since the three hemispheres associated with the three DMU station readings would intercept at a single point, the target. In particular, the exact location of the three DMU stations relative to each other must be known, and a time-related reading of their respective servo readouts obtained for performing the trigonometric calculations required to obtain the target location in the particular coordinate system of interest.

As implied above, one fairly obvious method for achieving spatial coordinate information of a target consists of using three different frequencies and employing three independent DMU systems; that is, three ground stations and three transponders in the target vehicle and overcoming obvious signal interference difficulties by operating each of the DMU ground units at a different frequency, and the three transponder return signals at three still different frequencies. All frequencies employed must be spaced sufficiently to avoid interference effects which, for practical considerations, should be at least several megacycles apart. The over-all frequency spread occasioned by the employment of six different frequencies offers a serious limitation since even larger bandwidths are allotted and must be used for the many telemetering, voice and other communication data links from airborne vehicles to ground and to each other. Furthermore, since airborne weight and space allotments are invariably set at a premium, in order to gain increased payloads, regardless of whether considered from the standpoint of bomber aircraft, commercial planes, missiles, etc., the employment of three airborne transponders would appear prohibitive, or at least an undue extravagance.

In accordance with the present invention, three spaced, identical DMU stations of the type set forth and modified in a manner to be shortly described, are operated in conjunction with a single vehicle-borne transponder; all ground stations operate on the same signal frequency and the transponder operates on a single other frequency. Hence, spatial coordinate information may be obtained without suffering the drawbacks of employing three separate systems, six frequencies and three transponders with their ensuing difficulties. Further, in accordance with the present invention, no ground-based information loops are needed between the three ground stations; instead, all information required to operate the three ground stations in conjunction with the single transponder is transmitted through the transponder.

In particular, one DMU station is delegated to act, as termed, as a Master station, and the two remaining stations as a Slave No. 1 and a Slave No. 2. As will be shortly seen, all DMU's are constructed similarly and by properly positioning internal switch arrangements in each, any ground station may be made to automatically function as either a Master, Slave No. 1 or Slave No. 2. However, to achieve coordinated information, one of the three stations, as stated above, must act as a Master, another as Slave No. 1 and the remaining as Slave No. 2. In this operation, the Master station's transmitter is pulsed 40 times per second, each pulse lasting approximately 8.5 milliseconds. Included in the range modulation signals of this Master station only is a special 30.735-kc. signal used for sequencing purposes and derived from its range signal generator. The transponder retransmits the Master signal, including the special sequencing signal. This retransmitted special modulation signal is sensed by the receiver sections in the Master and both Slave stations, and its trailing edge is used in Slave No. 1 for triggering its transmitter on for a timed approximately 8.5-millisecond duration. This trailing edge is also employed, in the Slave No. 2, for ordering an 8.5-millisecond delay followed by an activation of its transmitter for an 8.5-millisecond interval. Thus, the transmitter sections of the Master, Slave No. 1 and Slave No. 2 DMU stations are individually sequenced "on" for 8.5-millisecond intervals each. At approximately the end of the transmission time of the second Slave unit, the next regularly appearing 8.5-millisecond transmission of the Master station follows and the cycle is again repeated.

Associated with the techniques of transmitter sequencing, is the problem of relating the received signals at each station with the particular interrogation signal transmitted by that station, for correct phase comparison and range determination. This is solved by gating the range signals coming from the receiver section of each DMU station into the servo unit only during the effective time that its transmitter is being actuated. This, of course, corresponds to the only time during the cycle that the DMU received signals correspond to the target range from it, and not the other two stations. During all other times in the cycle, each receiver is effectively disconnected from the servo unit. Owing to the high pulse repetition rate, 40 cycles per second, and circuit filtering effects in portions of the receiver and servo units, continuous servo readouts are obtainable even though discrete sampling intervals are employed.

Figure 15:
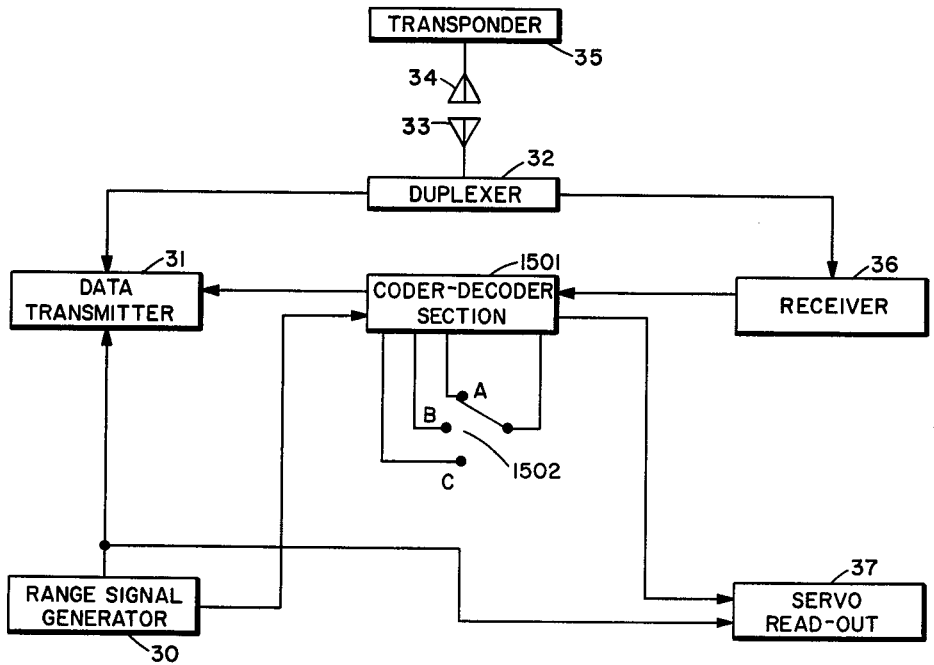
FIGURE 15 is a block schematic representation of a distance-measuring unit according to FIGURE 3, but modified in a schematic fashion, for serving as one station of a spatial coordinate determining system.

A DMU station capable of acting as a Master or Slave in the sequencing operation is shown in block diagrammatic form in FIGURE 15. The basic operating DMU sections corresponding to the presentation in FIGURE 3 are shown, and in addition, a coder-decoder section 1501 which serves in conjunction with the other sections to modify the previously described DMU station into one capable of acting selectively as a Master, Slave No. 1 or Slave No. 2. This coder-decoder unit 1501 is shown schematically as receiving a signal from range signal generator 30 and delivering an output signal to data transmitter 31. It likewise receives a signal from receiver 36 and applies signal information to servo unit 37. A station selector switch 1502 is associated in schematic fashion with section 1501, permitting selection of one of three contact points, a, b and c, which correspond to the DMU station functions of Master, Slave No. 1 and Slave No. 2, respectively.

Figure 16:
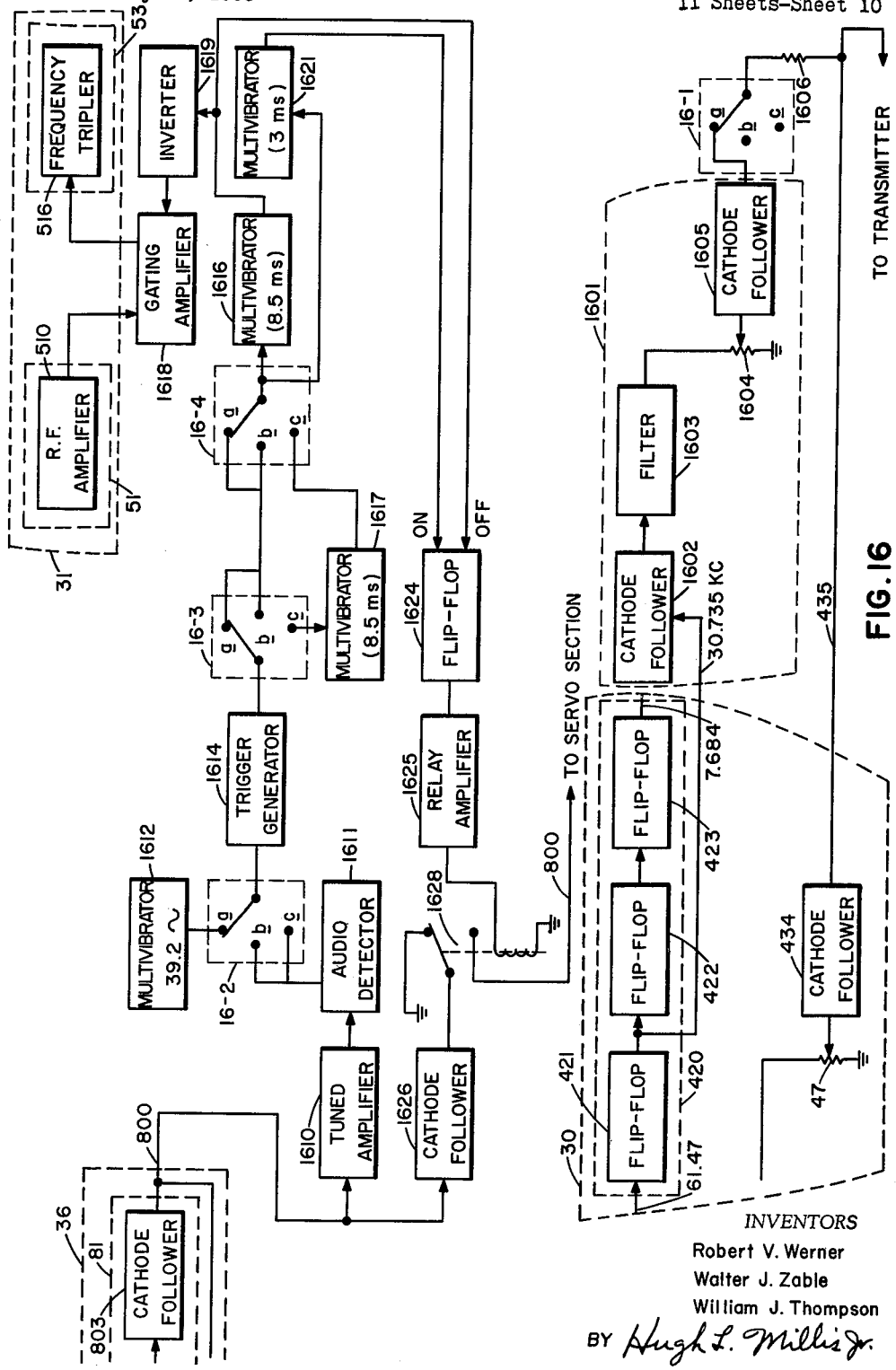
FIGURE 16 illustrates, partly in block schematic form and partly in detailed circuitry, a modified distance-measuring unit, in accordance with the present invention, for operating sequentially with similarly modified units for deriving spatial coordinate information of a target vehicle.

Referring now to FIGURE 16, there is shown in detail the coder-decoder section 1501 of FIGURE 15 and the details of its connections with the other DMU sections. In particular, the connection to the coder-decoder section from range signal generator 30 is taken from the output terminal of flip-flop 421 in the scale-of-eight counter circuit 420. Since the input signal to flip-flop 421 has a frequency of 61.47 kc., its output signal will be a square wave of 30.735 kc. It is applied to an output circuit generally designated 1601 and characteristic of the type found in the range signal generator. Circuit 1601 comprises a serially-connected cathode follower 1602, a filter 1603 for extracting the sine wave fundamental of the 30.735-kc. frequency, a voltage adjusting potentiometer 1604, and a cathode follower 1605. The output terminal of follower 1605 is connected to fixed switch point a of a switch section 16-1, whose movable arm is connected through a mixing resistor 1606 to the output line 435 coming from range signal generator 30. When switch section 16-1 is at its a position only, a 30.735-kc. sine-wave signal will be appropriately mixed with the other range modulating signals appearing on line 435.

Coder-decoder section 1501 receives the signal appearing on output conductor 800 of the receiver section 36, which, as shown earlier in FIGURE 8, is taken from the output terminal of a cathode follower 803, forming part of output section 81. This receiver output signal is applied serially through a tuned amplifier 1610, tuned to the 30.735-kc. sequencing modulation signal, to an audio detector 1611. The output terminal of detector 1611 is connected to contact points b and c of a switch section 16-2, the a contact point of section 16-2 being connected to the output terminal of a free-running multivibrator 1612, producing a 40-cycle square wave output signal. The switch arm of section 16-2 is connected through a trigger generator 1614 to the movable arm of a switch section 16-3. The a and b switch contact points of section 16-3 are connected together with their common junction being connected to contact points a and b of another switch section 16-4. The c contact point of section 16-3 is connected to the input terminal of a delay circuit, such as monostable multivibrator circuit 1617, delivering on demand an approximately 8.5-millisecond delay, whose output terminal, in turn, is connected to the c contact point of switch section 16-4.

The movable switch arm of section 16-4 is connected to the input terminals of a pair of delay circuits, such as multivibrator 1616 and multivibrator 1621, producing delays of 8.5 milliseconds and 3 milliseconds, respectively. The output terminal of multivibrator 1616 is coupled through an inverter 1619 to the input terminal of a gating amplifier 1618 and is also connected directly to the "off" input terminal of a bistable multivibrator circuit, such as flip-flop 1624. The output signal of multivibrator 1621 is applied to the "on" input terminal of flip-flop 1624.

Gating amplifier 1618 is connected serially between R.-F. amplifier 510 within the exciter-driver section 51 and the frequency tripler 516 in the output section 53, both of data transmitter section 31.

Finally, the output terminal of flip-flop 1624 is connected to the input terminal of a relay amplifier 1625, the output signal of which is applied across the relay coil of a relay 1628. The upper contact point of relay 1628 is grounded and its lower contact point and movable arm are serially-connected in the output conductor 800 of receiver section 36, through cathode follower 1626, to the servo readout unit.

In considering the operation of the coder-decoder of FIGURE 16, it will be recalled that three DMU stations must be simultaneously operated to acquire spatial coordinate information. This will be done by throwing the station selector switch in one station to its a contact position and letting that station operate as the Master. Then, the station selector switches in the two other stations will be set to the b and c contact positions, respectively, so that they will respectively operate as Slave No. 1 and Slave No. 2.

For the description of operation of a DMU station acting as the Master, assume that the switch arms in all switch sections in FIGURE 16 are thrown to their upper or a contact position. First of all, in this switch contact position, switch section 16-1 will couple the 30.735-kc. signal, derived through output section 1601 from the range signal generator 30, to the transmitter unit and this special signal transmitted along with the range modulation signals.

Figure 17:
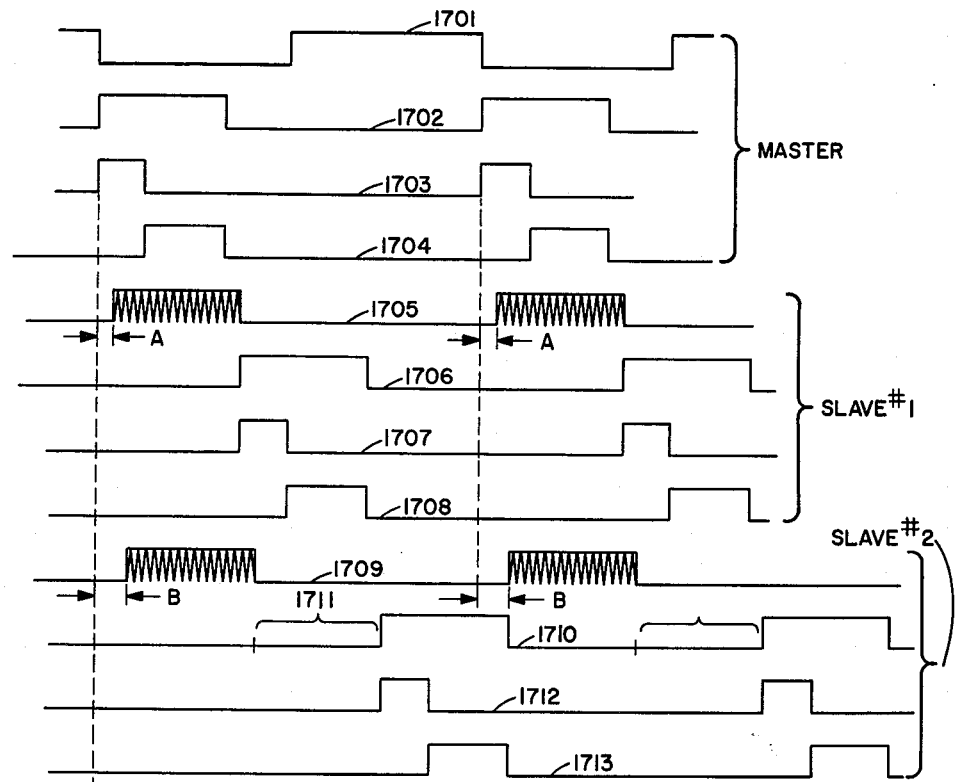
FIGURE 17 shows a group of signal waveforms serving to illustrate the operation of the circuit shown in FIGURE 16.

Switch section 16-2, in its a position will couple the output signal of 40-cycle free-running multivibrator circuit 1612 to the input terminal of trigger generator 1614. This multivibrator circuit generates a square-wave voltage waveform which is shown by way of example as signal waveform 1701 in FIGURE 17, FIGURE 17 showing a group of representative signal waveforms appearing in the circuit of FIGURE 16 for more fully revealing its detailed manner of operation.

This trigger generator 1614 may take several well-known forms, one being a grid-limited amplifier coupled to an over-biased triode amplifier. In this form, generator 1614 will respond to each cycle of waveform 1701, as it goes from its high to low voltage level to produce a large negative-going output pulse. These negative triggering pulses from generator 1614 will be coupled serially through the a switch contact points of switch sections 16-3 and 16-4 to the input terminals of 8.5-millisecond delay multivibrator 1616 and 3-millisecond delay multivibrator 1621, whose output signal waveforms are given by way of example at 1702 and 1703, respectively, in FIGURE 17. These multivibrators may be of the conventional cathode-coupled monostable or one-shot variety and will respond to the negative trigger pulses of generator 1614 for changing from their normal quiescent state to an "on" period where their output signal goes from a relatively low to a relatively high voltage level during the given 8.5- and 3-millisecond intervals, as shown in FIGURE 17.

The output signal of multivibrator 1616 in being applied to gating amplifier 1618 through inverter 1619 acts to couple the R.-F. amplifier output from R.-F. amplifier 510 to the input of frequency tripler 53, both in the transmitter section, so that during the high-voltage level interval in signal 1702 of multivibrator 1616, the transmitter circuit will be operable to transmit the frequency-modulated carrier to the transponder.

It is apparent that gating amplifier 1618 may take any one of a number of forms. One embodiment might comprise a tetrode and triode combination where the screen potential of the tetrode is established by clamping action of the triode. Thus, during the normal low-voltage level in signal 1702, a corresponding relatively high voltage furnished by the inverter to the triode would cause it to conduct, hence reducing the screen grid voltage of the tetrode tube to an effective cut-off condition. On the other hand, during the high voltage level interval in waveform 1702, the corresponding low voltage level supplied by inverter 1619 would act to cut off the triode hence applying full screen-grid voltage in the gating amplifier. This would, in turn, permit a corresponding normal amplifying action by the gating amplifier of the output signal of amplifier 510 with the result that signal transmission would take place through frequency tripler 516, etc.

Flip-flop 1624 is of the conventional two-input-terminal variety, here termed "on" and "off," and responsive, in accordance with conventional flip-flop terminology, to a negative-going signal applied to its "on" terminal for triggering to a conduction state such that the signal taken off of its output terminal will be at its high voltage level. On the other hand, a negative-going signal applied to its designated "off" input terminal will reverse the conduction state of flip-flop 1624 from that previously described and its output signal will go to a relatively low voltage level. In particular, the output signal of flip-flop 1624 is shown in signal waveform 1704 of FIGURE 17, where at the end of the 3-millisecond interval of signal waveform 1703 produced by multivibrator 1621, the flip-flop is triggered on to its high voltage level and at the end of the 8-millisecond interval of signal 1702, produced by multivibrator 1616, the flip-flop is triggered off, or back to its low voltage level. Hence, flip-flop 1624 will be on for the difference between the two multivibrator time-generated intervals, or 5.5 milliseconds.

Relay amplifier 1625 will respond to this high voltage level in signal 1704 by energizing the relay coil of relay 1628, hence causing the relay arm to move from its upper to its lower switch position. This, in turn, acts to couple the phase-delayed range signals from the receiver unit appearing on line 800 through cathode follower 1626 to the servo readout section for the 5.5-millisecond interval corresponding to the "on" time of flip-flop 1624. As will be shortly seen, it is only during this portion of a single cycle as marked by the 40-cycle signal 1701, the Master station communicates with the transponder and the delayed signals from the transponder, corresponding to the Master transmitted signal, are coupled to the Master station servo readout for its readout purposes.

Consider now the operation of a DMU station functioning as Slave station No. 1, effected by the station selector switch being thrown to the *b* contact position. First of all, the transponder signal, corresponding to the "on" time of the Master station transmitter during this first portion of operation will be received by this Slave station No. 1 as a delayed signal and is shown as waveform 1705 in FIGURE 17. The exact amount of delay, indicated by way of example at "A" in the waveform, will correspond to the total distance traveled by the Master transmitted signal, which will equal the distance between the Master station and the transponder, and the distance between the transponder and this first Slave station.

In this *b* selector switch position, Slave station No. 1 does not transmit the 30.735-kc. signal derived from the range signal generator as a modulation component on its carrier signal since the *b* contact position in switch section 16-1 is open and output circuit 1601 effectively disconnected from line 435 going to the transmitter unit.

Further, in this *b* position, multivibrator 1612, as employed for Master station operation, is disconnected and, instead, tuned amplifier 1610 and audio detector 1611 coupled to trigger generator 1614. Amplifier 1610 is tuned to the 30.735-kc. sequencing signal generated by the Master station, and is amplified output signal is detected as the envelope of signal 1705 by audio detector 1611 and applied to trigger generator 1614. Now, trigger generator 1614 will respond to the trailing edge, that is, as signal 1705 goes from its high to low voltage level, as described previously for signal 1701 in the Master station operation, for supplying a triggering pulse through switches 16-3 and 16-4 to multivibrators 1616 and 1621. These multivibrators will respond as described previously for the Master station operation and produce respective 8.5- and 3-millisecond delays, as shown in their signal waveforms 1706 and 1707, respectively, in FIGURE 17.

As was the case for the Master station operation, during the time multivibrator 1616 is "on" for its 8.5-millisecond intervals, gating amplifier 1618 is operable to transmit the frequency-modulated range signal from this first Slave. Flip-flop 1624 will be turned on and off again, as in waveform 1708, by signals 1706 and 1707 and, during its "on" time amplifier 1625 will actuate relay 1628 to thereby couple the output range signals from the receiver to the servo unit.

The operation of a DMU station as a second Slave station, effected by setting the selector switch to the *c* contact position, is similar to that described for the first Slave operation except that an extra 8.5-millisecond delay is introduced by placing multivibrator 1617 between trigger generator 1614 and multivibrators 1616 and 1621. The delay introduced by the insertion of multivibrator 1617 is shown as interval 1711 in waveform 1710 of FIGURE 17 representing the output signal of multivibrator 1616.

Signal waveform 1712 in FIGURE 17 represents the output signal of multivibrator 1621 while waveform 1713 represents the "on" time of flip-flop 1624 and hence the interval during which the received signals of Slave No. 2, corresponding to its transmitted signal, are coupled to its servo section for readout purposes.

Figure 18:
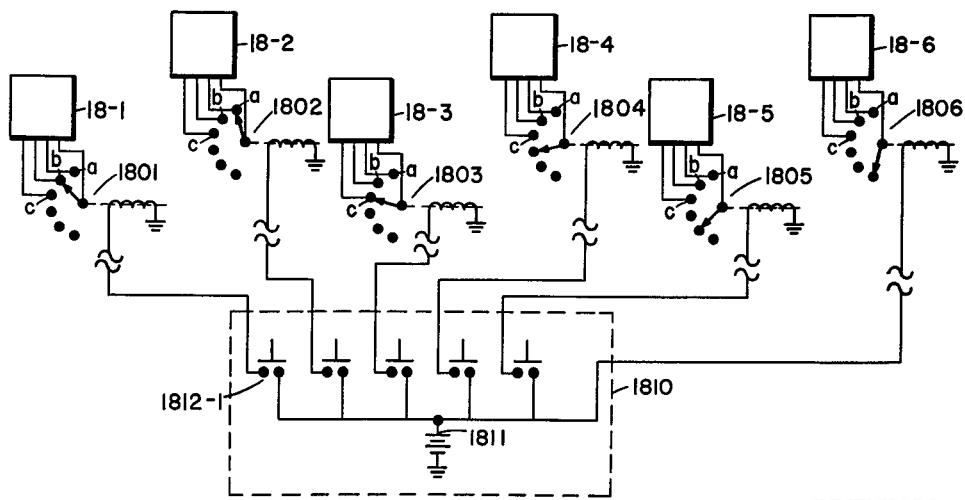
FIGURE 18 illustrates schematically the manner of sequentially forming several sets of distance-measuring units for achieving long-range tracking capabilities in accordance with the present invention.

An arrangement is shown in FIGURE 18, by which the total range of the distance-measuring system according to the present invention may be extended indefinitely. Here, shown by way of example, in block diagrammatic form, are a series of DMU stations, indicated at 18-1, 18-2, etc., through 18-6, appropriately spaced along the anticipated track of a target vehicle such that, at no instant of time, will the target vehicle be further than about 200 miles, continuing the example set forth for a single DMU stataion, from any of three stations.

A stepping switch having terminals designated *a*, *b* and *c* similar to the switch connections shown for switch 1502 in FIGURE 15, and additionally including a number of blank, unconnected terminals, is associated with each station and are designated 1801, 1802, etc., through 1806. It will be appreciated that the schematic form of illustration herein given for a stepping switch will include corresponding switch sections, similar to those shown in detail in FIGURE 16, except that each switch section will include additional blank contacts corresponding to those shown in FIGURE 18. All blank contacts will be, as herein shown, unconnected to any station circuitry.

The energizing coils of the stepping switches associated with each DMU station are connected through appropriate wire leads, shown by way of example, into a master control panel, 1810. Each of these connecting leads goes to one contact point of a corresponding push-button, the other contact point of all push-buttons being connected together to the positive terminal of a source of potential, such as battery 1811.

Upon depression of any push-button, the current from source 1811 will be conducted through the push-button contact points to its corresponding stepping switch coil with the result that the stepping switch will advance one contact point, in an assumed counter-clockwise direction. By way of example, then, if push-button 1812-1 were depressed, the stepping arm of switch 1801 associated with DMU station 18-1 would be automatically moved one position from its *b* to its *c* contact position.

Since an operable distance-measuring system comprises three DMU stations, having *a*, *b* and *c* respective switch contact positions, it is apparent that the operator controlling panel 1810 must switch out one DMU station and switch in another station as the target vehicle leaves the range capabilities of the furthest of the three DMU stations and becomes in-range of another, as then unused, DMU station. This will be accomplished by energizing the push-button corresponding to the DMU station approaching the off-range condition, such that its stepping switch contact arm is moved to one of the blank contact positions with the result that the station no longer operates as one of the three. Also, at this time, the operator should push the push-button of the DMU station to replace the disengaged one until the stepping switch contact arm contacts the appropriate *a*, *b* or *c* point compatible with the remaining two stations.

By following this sequence of operation, that is, de-energizing one DMU station and energizing another DMU station, so that three DMU stations are in range of the target at all times, it is apparent that target tracking capabilities can be extended to any desired distance by merely extending the number of spaced DMU stations along the track and sequentially switching proper stations in and out of operative association with the target vehicle as it proceeds downrange.

It is apparent that the six DMU stations illustrated here by way of example are illustrative only of the technique of increasing the basic range of a single set of DMU stations, and can be extended indefinitely in the manner shown without involving invention.

It will also be apparent that in the entire system shown and described, numerous modifications and changes may be incorporated in the particular arrangement of circuits for accomplishing the over-all functions set forth without involving invention. It is also apparent that each of the circuits, as shown in block diagrammatic form, may take any one of many well-known recognized forms, as well-known in the art and shown in the numerous handbooks, technical books, etc., without the employment of invention.

It will be appreciated, of course, by those skilled in the art, that the foregoing disclosure relates only to a detailed preferred embodiment of the invention whose spirit and scope of the invention is set forth in the appended claims.

What is claimed is:

1. A sequencing system for operatively employing first, second and third electronic units to produce spatial coordinate information of a radio-responding object, each of said electronic units being operable when actuated to communicate with said responding object and determine the slant range thereto, said sequencing system comprising: timing means associated with said first electronic unit for actuating said first electronic unit for a first predetermined time interval; means associated with said second electronic unit and responsive to the completion of the actution of said first electronic unit by said timing means for actuating said second electronic unit for a second predetermined time interval; first electronic delay means responsive to the actuation of said first electronic unit by said timing means for introducing a delay interval equal at least to said second predetermined time interval; and means responsive to the end of the delay interval introduced by said delay means for actuating said third electronic unit for a third predetermined time interval whereby said first, second and third electronic units are sequentially operated.

2. An electronic system for producing spatial coordinate information of an object, said system comprising: first, second and third spaced transmitter units, each of said units including actuable means responsive when actuated for transmitting a series of simultaneous interrogating signals, said series of signals being of increasing longer wavelengths; transponder means in said object and responsive to the receipt of a series of interrogating signals from said transmitter units for retransmitting said series of signals without phase delay; first, second and third spaced receiver units associated with said first, second and third transmitter units, respectively, each of said receiver units including receiver means for receiving the series of retransmitted signals from said transponder, means responsive to the series of interrogating signals produced by the actuable means of its associated transmitter unit and the received series of retransmitted signals from the receiver means for determining the series of phase differences therebetween, and means responsive to the series of phase differences determined by the last-named means for indicating the slant range of the object from its associated transmitter unit; and means for sequentially actuating the actuable means in said first, second and third transmitter units.

3. The system, according to claim 2 wherein the last-named means includes, in addition, timing means for independently actuating the actuable means in said first transmitter unit at periodic intervals, and means associated with said second and third transmitter units responsive to the retransmitted signal from the transponder means corresponding to the actuation of the actuable means in said first transmitter unit for actuating the actuable means in said second and third transmitter units between said periodic intervals.

4. An electronic system for producing spatial coordinate information of an object, said system comprising: first, second and third spaced transmitter units, each of said units being at least a predetermined distance from said object and including actuable means responsive when actuated for transmitting a series of simultaneous interrogating signals, said series of signals being of increasing longer wavelengths, the longest wavelength of said series of signals corresponding to said predetermined distance; transponder means in said object and responsive to the receipt of a series of interrogating signals from said transmitter units for retransmitting said series of signals without phase delay; first, second and third spaced receiver units associated with said first, second and third transmitter units, respectively, each of said receiver units including receiver means for receiving the series of retransmitted signals from said transponder, a series of phase comparing means corresponding to said series of interrogating signals, each of said phase comparing means being responsive to the phase difference between a pair of applied signals for indicating the phase difference therebetween, and means for applying the series of interrogating signals produced by the actuable means and the series of retransmitted signals from the receiver means to said series of phase comparing means, respectively, whereby the series of indications of said series of phase comparing means represent the slant range of the object from its associated transmitter unit without ambiguity; and means for sequentially actuating the actuable means in said first, second and third transmitter units.

5. An electronic system for producing location information of a transponder-carrying object, said transponder being responsive to a ground-transmitted signal for retransmitting said signal, said system comprising: at least a pair of transmitter-receiver units, each of said units being operable when actuated for transmitting and receiving signals from the transponder in said object for determining respective slant ranges thereto; a pair of circuit means coupled to said pair of transmitter-receiver units, respectively, each of said circuit means including first and second actuable means, said first actuable means being responsive when actuated for independently actuating its associated transmitter-receiver unit, and said second actuable means being responsive when actuated for causing its associated transmitter-receiver unit to be actuated by a transponder-retransmitted signal from the other of said paired transmitter-receiver units.

6. The system according to claim 5 including first and second means coupled to said pair of transmitter-receiver units, respectively, for actuating the first and second actuable means of the circuit means in said pair of transmitter-receiver units, respectively, whereby said pair of transmitter-receiver units are cooperatively operated.

7. A system for deriving information of a target vehicle position in space, said system comprising: first, second and third fixed transmitter systems, each of said transmitter systems being at least a predetermined distance from said vehicle and including range signal generating means for generating a series of range signals having a series of increasingly longer wavelengths, respectively, the longest wavelength of said series corresponding at least to said predetermined distance, signal generating means for generating a carrier signal of a first frequency, modulating means for modulating said series of range signals on the carrier signal generated by said signal generator means, and selectively actuable means operable when actuated for transmitting the modulated carrier signal produced by said modulating means; transponder means located in said target vehicle, said transponder means including a transponder receiving means for receiving the modulated carrier signal produced by the selectively actuable means in either of said first, second or third fixed transmitter systems, transponder demodulating means for demodulating the series of range signals from the modulated carrier signal received by said receiving means, transponder signal generator means for generating a transponder carrier signal of a second frequency, transponder modulation means for modulating the demodulated range signals on said transponder carrier signal, and transponder transmitter means for transmitting the modulated carrier signal produced by said transponder modulating means; first, second and third receiver systems associated with said first, second and third fixed transmitter systems, respectively, each of said receiver systems including, receiving means for receiving the modulated carrier signal of said second frequency transmitted by said transponder transmitter, and demodulating means for demodulating the series of range signals from the modulated carrier signal received by said receiver means, the phase difference between each of the series of demodulated range signals and its corresponding range signal produced by said range signal generating means being a function of the scalar distance of said vehicle from said associated transmitter and receiver system; first, second and third servo readout systems associated with said associated pairs of first, second and third transmitter and receiver systems, respectively, each of said servo readout systems including, a series of signal channels corresponding to said series of range signals, respectively, each of said signal channels including a positional means and responsive to the phase difference between a pair of input signals and the position of said positional means for producing an output error signal, said output error signal going to a minimum when the position of said positional means corresponds to said phase difference, means for applying the series of range signals produced by said range signal generating means to said series of signal channels, respectively, selectively operable means operable when actuated for applying the series of range signals produced by said demodulating means to said series of signal channels, respectively, whereby a series of error signals are produced by the series of positional means in said series of channels, gear-down means coupled to said series of positional means at a series of gear-down points corresponding to the increasingly longer wavelengths of the associated channel range signals, actuable motor means connected to said gear-down means and responsive when actuated for driving said gear-down means, and selectively actuable means responsive to an output error signal, other than said minimum value, of the positional means in the channel corresponding to the longest wavelength for driving said actuable motor means to reduce said output error signal to said minimum value whereby all of said channels are selectively driven to produce said minimum value and the positions of said series of positional means represent the slant range to said target vehicle; and sequencing means coupled to the selectively actuable means in said first, second and third fixed transmitter systems and to the selectively operable means in said first, second and third servo readout systems for sequentially actuating said selectively actuable means and said selectively operable means whereby said first, second and third transmitter systems and associated servo readout systems are sequentially operated to produce first, second and third slant ranges to said target vehicles.

8. A system for deriving location information of a target vehicle position, said vehicle being positioned within at least a predetermined distance from said system, said system comprising: a transmitter system including a range signal generating means for generating a series of range signals having a series of increasingly longer wavelengths, respectively, the longest wavelength of said series corresponding at least to said predetermined distance, signal generating means for generating a carrier signal of a first frequency, modulating means for modulating said series of range signals on the carrier signal generated by said signal generator means, and transmitting means for transmitting the modulated carrier signal produced by said modulating means; transponder means located in said target vehicle, said transponder means including transponder receiving means for receiving the modulated carrier signal produced by the transmitting means in said transmitter systems, transponder demodulating means for demodulating the series of range signals from the modulated carrier signal received by said receiving means, transponder signal generator means for generating a transponder carrier signal of a second frequency, transponder modulation means for modulating the demodulated range signals on said transponder-carrier signal, and transponder transmitter means for transmitting the modulated carrier signal produced by said transponder modulating means; a receiver system associated with said transmitter system, said receiver system including, receiving means for receiving the modulated carrier signal transmitted by said transponder transmitter, and demodulating means for demodulating the series of range signals from the modulated carrier signal received by said receiver means, the phase difference between each of the series of demodulated range signals and its corresponding range signal produced by said range signal generating means being a function of the distance of said vehicle from said associated transmitter and receiver system; and a servo readout system associated with said associated transmitter and receiver system, said servo readout system including, a series of signal channels corresponding to said series of range signals, respectively, each of said signal channels including a positional means and responsive to the phase difference between a pair of input signals and the position of said positional means for producing an output signal, said output signal going to a minimum when the position of said positional means corresponds to said phase difference, means for applying the series of range signals produced by said range signal generating means to said series of signal channels, respectively, means for applying the series of range signals produced by said demodulating means to said series of signal channels, respectively, whereby a series of error signals are produced by the series of positional means in said series of channels, gear-down means coupled to said series of positional means at a series of gear-down points corresponding to the increasingly longer wavelength of the associated channel range signals, actuable motor means connected to said gear-down means and responsive when actuated for driving said gear-down means, and means responsive to an output error signal, other than said minimum value, of the positional means in the channel of the longest wavelength for driving said actuable motor means to reduce said output error signal to said minimum value whereby all of said channels are consecutively driven to produce said minimum value and the positions of said series of positional means represent the distance to said target vehicle.

9. A sequencing system for employing first, second and third electronic units to provide spatial coordinate information of a radio responding object, each of said electronic units including a selectively operable transmitter for producing an output signal when operated which is returned by said radio responding object and a receiver responsive to the signal returned by said radio responding object when its associated transmitter is operated for deriving slant range information to the radio responding object, said system comprising: timing means for actuating the transmitter in said first electronic unit for the first portion of each of a series of periodic timing intervals; signal injection means in said first electronic unit responsive to the operation of the said timing means for producing and injecting an additional signal in the output signal produced by the transmitter in said first electronic unit; means associated with the receiver in said second electronic unit and responsive to the additional signal injected in the transmitted signal by said signal injection means in said first electronic unit for operating its corresponding transmitter for a middle portion in each of the said periodic timing intervals; and means associated with the receiver in said third electronic unit and responsive to the additional signal injected in the transmitted signal of the first electronic unit by said signal injection means for operating the transmitter of said third electronic unit for the latter portion of each of said periodic timing intervals, whereby said first, second and third electronic units sequentially interrogate the radio responding object and derive slant range information thereto.

References Cited in the file of this patent

UNITED STATES PATENTS

| | | |
|---|---|---|
| 2,406,953 | Lewis | Sept. 3, 1946 |
| 2,470,787 | Nosker | May 24, 1949 |
| 2,730,714 | Mahoney | Jan. 10, 1956 |
| 2,768,374 | Rust | Oct. 23, 1956 |
| 2,843,846 | Hawkins | July 15, 1958 |
| 2,844,816 | O'Brien et al. | July 22, 1958 |
| 2,857,592 | Hoffman | Oct. 21, 1958 |